(12) United States Patent
Crane et al.

(10) Patent No.: US 9,048,039 B2
(45) Date of Patent: Jun. 2, 2015

(54) VACUUM SWITCH ASSEMBLIES

(75) Inventors: Allan David Crane, Trawsfynydd (GB); Martin Samuel Butcher, Warwickshire (GB)

(73) Assignee: GE Energy Power Conversion Technology Limited, Warwickshire (GB)

(*) Notice: Subject to any disclaimer, the term of this patent is extended or adjusted under 35 U.S.C. 154(b) by 437 days.

(21) Appl. No.: 13/466,388

(22) Filed: May 8, 2012

(65) Prior Publication Data

US 2013/0301180 A1   Nov. 14, 2013

(51) Int. Cl.
| | | |
|---|---|---|
| H02H 3/20 | (2006.01) |
| H01H 9/54 | (2006.01) |
| H01H 33/59 | (2006.01) |
| H01H 33/66 | (2006.01) |
| H01H 33/02 | (2006.01) |

(52) U.S. Cl.
CPC . H01H 9/54 (2013.01); H02H 3/20 (2013.01); H01H 33/027 (2013.01); H01H 33/596 (2013.01); H01H 33/66 (2013.01)

(58) Field of Classification Search
CPC ....... H01H 83/20; H01H 9/54; H01H 33/596; H02H 3/08; H02H 3/20
See application file for complete search history.

(56) References Cited

U.S. PATENT DOCUMENTS

| | | | |
|---|---|---|---|
| 7,911,303 B2 * | 3/2011 | Morita et al. | 335/174 |
| 7,928,709 B2 * | 4/2011 | Erbito, Jr. | 323/274 |
| 8,049,358 B2 * | 11/2011 | Crane et al. | 307/9.1 |
| 2014/0129195 A1 * | 5/2014 | He et al. | 703/2 |

FOREIGN PATENT DOCUMENTS

| | | | |
|---|---|---|---|
| DE | 3910010 | 10/1989 | |
| DE | 3910010 A1 | 10/1989 | |
| DE | 102007004527 | 7/2008 | |
| DE | 102007004527 A1 | 7/2008 | |
| DE | WO 2008/090178 * | 7/2008 | ............. H01H 33/66 |
| EP | 0563904 | 6/1993 | |
| EP | 0563904 A1 | 10/1993 | |

(Continued)

OTHER PUBLICATIONS

Ezra et al. Vacuum Circuit Breaker Current-Zero Phenomena, Oct. 2005, IEEE Transactions on Plasma Science, vol. 33, No. 5. IEEE Press.*

(Continued)

*Primary Examiner* — Zeev V Kitov
(74) *Attorney, Agent, or Firm* — Parks Wood LLC

(57) ABSTRACT

The present invention relates to a vacuum switch assembly for interrupting and isolating fault current. The vacuum switch assembly includes first and second dc lines that, in use, are electrically connected to the dc output terminals of a primary dc power source and a dc network. Each dc line includes at least one vacuum switch having contacts that are opened and closed under the control of a vacuum switch controller. A passive dc power supply unit is electrically connected to the first and second dc lines and includes a secondary dc power source that provides a substantially ripple-free sensing voltage. The vacuum switch controller is adapted to open the vacuum switch contacts when a fault condition (e.g. a fault current or other fault) or an operator request has been identified and when the current flowing between the vacuum switch contacts is below a chopping current associated with the vacuum switches.

31 Claims, 6 Drawing Sheets

(56) References Cited

FOREIGN PATENT DOCUMENTS

| | | |
|---|---|---|
| EP | 1939909 | 2/2008 |
| EP | 1939909 A2 | 7/2008 |
| WO | 2011/050832 A1 | 5/2011 |
| WO | 2011050832 | 5/2011 |

OTHER PUBLICATIONS

EP12167067 International Search Report, Oct. 11, 2012, 2 pgs.
PCT Search Report issued in connection with corresponding WO Patent Application No. EP2013/059239 dated on Aug. 9, 2013.

\* cited by examiner

VACUUM SWITCH ASSEMBLIES

FIELD OF THE INVENTION

The present invention relates to vacuum switch assemblies (or vacuum circuit breakers), and in particular to vacuum switch assemblies that are used to interrupt and isolate dc fault current.

BACKGROUND OF THE INVENTION

It is possible to convert renewable energy such as wind, wave, tidal energy or water current flows into electrical energy by using a turbine assembly to drive the rotor of a generator, either directly or by means of a gearbox. Other renewable-energy devices can be used to convert solar energy into electrical energy.

Renewable-energy devices can be connected together in clusters. Separate clusters of renewable-energy devices can then be connected together to a point of common coupling or collection point, this connection typically being made by means of a transformer with protective switchgear. The power output from the collection point is then transmitted to its destination (e.g. in the case of an off-shore wind turbine farm then this might be an onshore converter station which provides the power to a supply network or power grid) after being transformed and optionally rectified to a suitably high transmission voltage.

In the case where a renewable-energy device (e.g. a wind turbine or subsea turbine) includes a generator then it will typically also include a circuit breaker to interrupt fault currents. The circuit breaker can include off load isolators with safety earthing provision to allow a faulty generator to be bypassed during maintenance or repair.

Such arrangements are characterised by having interconnecting cables that incur significant charging current and eddy current losses as a result of high voltage ac (HVAC) operation. When a low impedance fault occurs within a particular cluster then it is accepted that power output from the cluster is interrupted until protecting switchgear interrupts the fault as a result of the collapse in line voltage whilst high magnitudes of fault current flow. The fault current is initially limited only by the combined impedances of all the power sources that are electrically connected to the cluster but the associated circuit breaker will then operate after a delay of up to about 150 ms. Cabling and protective switchgear must therefore be rated to withstand the thermal and mechanical effects of a significant current overload. The fault current must also be interrupted by the circuit breaker which is then exposed to rated line voltage after current interruption. The risk of re-strike in protective switchgear is significant and large surge arrestors can be required. In large, high power systems, the magnitude of the current overload may only be limited by appropriate choice of passive impedances, thereby adding further to the cost, complexity, size and reactive voltage drop of the power collection and transmission system. In such ac systems it is commonly a requirement that all generators contribute a substantial reactive current when line voltage drops below a particular threshold as part of a grid fault ride through strategy and, although generators incorporate actively controlled power electronics, they are not permitted to substantially reduce the above fault current magnitude.

Some arrangements use high voltage dc (HVDC) transmission, particularly for offshore wind or subsea turbine farms. Arrangements that use HVDC transmission do not have the charging current and eddy current losses that are inherent to HVAC systems. They also provide the flexibility to optimise the transmission voltage (i.e. the voltage carried by the transmission cable) and current choice without having to consider the charging current constraints. The power converter that is used to interface the transmission cable to the supply network or power grid can actively contribute to grid stability and quality of power supply. However, HVDC transmission also suffers from the disadvantage that it is necessary to actively rectify the ac power output of the generators in a converter station which sometimes needs to be located offshore, e.g. on a suitable platform.

Hybrid circuit breakers have been proposed for HVDC arrangements that employ mechanical contacts that open after current in the contact system has been reduced to zero, or even reversed, by dedicated and active current interruption means. These active current interruption means are typically complex and the term 'hybridisation' is used to describe the integration of mechanical switch contact functionality with the functionality of the dedicated and active means of current interruption. The active means typically includes power electronic switches, their switching aid networks (snubbers) and non-linear surge arresters. It is commonplace for the use of such hybrid circuit breakers to be proposed as a means of interrupting dc fault currents that flow in high power static power converter equipment and thus severe cost, efficiency and size penalties are incurred as a result of a requirement to employ two sets of power electronic equipment. A number of hybridisation techniques have been proposed where vacuum switchgear contacts start to open and a resonant commutation circuit is connected across the contacts, thereby causing periodic and short lived current reversals to occur in the low pressure metal vapour arc that forms between the progressively opening vacuum switch contacts. The arc is permitted to extinguish because cathode spot activity at low current density is sporadic and particularly rapid. However, the risk of re-strike has not been reliably addressed in such systems since the components of the resonant commutation circuit are very large if the resonant frequency is reduced to a sufficiently low value to permit the arcing system a conservatively large recovery time, and there is a practical motivation to reduce or minimise the size of the circuit components. The limitation of such hybridisation techniques is in their reliance upon a high frequency ac commutation mode whilst available vacuum switch components are typically optimised for line operation at 50 or 60 Hz for commercial reasons.

Conventional vacuum switches (sometimes called vacuum circuit breakers) are used in HVAC protection systems and the periodic current reversals that inherently occur in such systems have a fundamental bearing on the operation of these devices. The basic function of the vacuum switch is to interrupt fault current. The vacuum switch can be reset (either automatically or manually) to resume normal operation. The vacuum switch includes contacts that can be opened and closed by a mechanical actuation system. The mechanical actuation system can be triggered in response to the presence of a fault current or a manual command and the opening of the contacts starts asynchronously with respect to the ac line voltage and current. Since ac power factor may be anywhere between 0 pf lag to 0 pf lead, the ac current waveform can be phase shifted within a range of one half cycle of the line frequency relative to the ac line voltage waveform. The contacts open at a high acceleration rate and the ability of the gap between contacts to withstand voltage after current has been interrupted increases correspondingly, typically attaining the rated performance in about 7 ms after first contact separation. However the opening of the contacts whilst current is flowing generally does not cause interruption of the current until the next zero crossing in the ac waveform occurs. In a first example, the contacts may start to open at the start of a half cycle of current. This half cycle of current will then flow between the contacts as a low pressure metal vapour arc (or vacuum arc) without interruption until a short time after the next reversal of current, this time being defined by the chopping behaviour of the vacuum switch. In this example the current interruption occurs after the contacts have been fully separated since the typical 7 ms contact opening phase is shorter than the typical 8 or 10 ms half cycle duration. Immediately after the current interruption the vacuum switch will experience a transient recovery voltage between the contacts that is defined by the sum of the ac line voltage at that instant and a resonant transient. The ac line voltage at that instant depends on power factor and it is possible that peak line voltage is experienced. The resonant transient is caused by the response of the connected ac network to the chopping behaviour of the vacuum switch. In this example, the contact gap is fully open and has its maximum voltage withstand capability at the time of current interruption and consequent generation of a transient recovery voltage. In a second example, the contacts may start to open a small fraction of 1 ms before the current reversal when the gap between contacts may be a small fraction of their fully open gap. Under these circumstances three distinct behaviour types may be experienced: (i) the current may not be interrupted and the switching operation will continue as for the first example, (ii) the current may be interrupted but the contact gap may be insufficient to withstand the transient recovery voltage and the arc between contacts may re-strike, thereafter the switching operation will continue as for the first example, and (iii) the current may be interrupted whilst the contact gap is sufficient to withstand the transient recovery voltage but the switch may be susceptible to re-strike. Moreover, in a development of behaviour type (ii)—which may be referred to as type (iv)—after re-striking the vacuum switch may subsequently interrupt current and re-strike repetitively at a repetition frequency that is defined by the response of the cable interconnection system in conjunction with the stray impedances in the vacuum switch circuit. When the asynchronous nature of vacuum switch actuation and the power factor of the circuit whose current is interrupted are such as to promote a risk of type (iv) behaviour then the use of particularly large surge arrestors may be required. The susceptibility of a power system to type (iv) behaviour is strongly dependent upon the chopping characteristics of the vacuum switch.

The term 'chopping' is used to describe the extremely rapid decay of current that is forced by the extinction of a low pressure metal vapour arc between the contacts of the vacuum switch. Once chopping is completed, typically <100 ns after initiation, current no longer flows between the contacts of the vacuum switch unless re-strike occurs. The transient recovery voltage mentioned above and its rate of application must be limited to less than the time-variable and increasing dielectric withstand between the opening or opened contacts in order to prevent re-strikes. The chopping behaviour of conventional vacuum switches is extremely complex but occurs when current is below a particular threshold for a particular length of time. This threshold and its time dependency are subject to contact conditions that were prevailing before the contacts were opened. It is also important to note that arc extinction/re-ignition behaviour is cyclic, sporadic and can be characterised in terms of having a cathode spot lifetime that varies according to a statistical distribution. In over-current faults and ac load breaking circumstances, the chopping occurs at an instantaneous current that increases with the current that flows in the preceding half cycle. Since the inductively stored energy that is associated with the magnitude of the chopping current has an influence on both extinction and the likelihood of re-ignition, it is not surprising that the efforts of vacuum switch designers have focused on chopping current reduction.

SUMMARY OF THE INVENTION

The present invention provides an alternative vacuum switch assembly for interrupting and isolating dc fault current, the vacuum switch assembly comprising:

first and second dc lines electrically connectable (i.e. in use) to the dc output terminals of a primary dc power source and a dc network, at least one of the first and second dc lines including at least one vacuum switch having contacts, each vacuum switch having a chopping current which is dependent upon the prevailing operating conditions of the vacuum switch before its contacts open;

a passive dc power supply unit electrically connected to the first and second dc lines, the passive dc power supply unit including a secondary dc power source; and a vacuum switch controller for controlling the opening and closing of the contacts of each vacuum switch, wherein the vacuum switch controller is adapted to open the vacuum switch contacts when a fault condition (e.g. the presence of a fault current or other fault) or an operator request has been identified and when the current flowing between the vacuum switch contacts is below the chopping current.

Any suitable type of vacuum switch can be used. In the case where the vacuum switch assembly is adapted to carry a unipolar dc voltage then one of the first and second dc lines can be un-switched, i.e. it will not include a vacuum switch. However, in the case where the vacuum switch assembly is adapted to carry a bipolar dc voltage then the first dc line will include a first vacuum switch and the second dc line will include a second vacuum switch, both of the vacuum switch contacts being opened and closed under the control of the vacuum switch controller. Any description herein which refers to two or more vacuum switches is, where appropriate, also to be taken to refer to a vacuum switch assembly with only a single vacuum switch.

Typically, both of the vacuum switches used in the vacuum switch assembly will be of the same type. Each dc line can include more than one independent vacuum switch connected together in series or may include a double break vacuum switch, i.e. a vacuum switch with two series-connected contact systems within a common vacuum housing. The vacuum switches can be precisely synchronised by any suitable method, for example by using one of the following methods: (i) a common mechanical actuator may be used by the respective contact systems, (ii) a common electronic trigger signal may be received by identical fast electronic trip units that provide an impulse to the mechanical actuator of each vacuum switch, or (iii) the common trigger signal may be routed to each fast electronic trip unit through precisely preset electronic time delays of typically less than 1 ms. In any case the mechanical actuation times of the vacuum switches are normally precisely toleranced. When synchronised by these methods the times at which respective contacts first start to separate will typically have a spread of less than 1 ms. Optionally, when two vacuum switches are connected in series or a double break vacuum switch is provided in each dc line of the vacuum switch assembly, giving a total of four vacuum switch contact systems, the series-connected vacuum switch contact systems can be set to open and close in a pre-determined sequence using a variation of method (iii) in which the time delays may be independently controlled in both directions.

Each vacuum switch will include contacts that can be opened and closed when a signal is received at the shunt trip actuator input (or equivalent) of the vacuum switch. A vacuum switch may be characterised as having a chopping current which is dependent upon the prevailing operating conditions of the vacuum switch before its contacts open. Providing the current that flows in a vacuum switch has been reduced from its thermal rating to less than say 5% of its thermal rating and this reduction occurs over a period of at least 50 ms, its contact system will not retain hot spots of such severity as to influence its chopping and re-strike behaviour in a manner that renders it unable to operate as described in more detail below. The chopping currents of commercially-available vacuum switches are optimised for ac applications wherein minimisation of chopping current and consequent switching voltage transients is a distinct advantage. However, it will be understood that the present invention employs such vacuum switches within a dc circuit, or more typically a high voltage dc (HVDC) circuit. Optionally, vacuum switch contact material composition may be optimised for HVDC operation and this might result in an adjustment in the trade offs between contact resistance, contact wear and chopping current. But it is generally preferred to employ conventional ac vacuum switch components wherever possible.

The vacuum switches can have a conventional housing (or bottle) and mechanical actuator assembly. When the contact faces are substantially un-affected by hot spots and the contacts start to open whilst a dc current substantially less than the chopping current (typically less than 10 A and greater than 2 A) is present, a low pressure metal vapour arc is ignited and is characterised by instability of a type that causes the arc rooting to sporadically extinguish and then re-ignite in a different location. The extinction/re-ignition phenomenon occurs in a sub-100 ns timescale and by the time the contact faces have separated by only a small fraction of their fully open condition the arc instability is such as to prevent re-ignition and thus the vacuum switch 'chops' current, the term 'chopping' defining that the fall time of the arc current is substantially less than 100 ns. The rate of change of current during chopping is such as to cause a voltage drop to be developed across any stray inductances that may exist in a so-called 'commutating loop'.

While the current is rapidly falling in the arc, the inductive voltage initially rises and then remains at a significant level whilst stray capacitive impedances charge. The voltage across a vacuum switch contact and developed arc therefore includes inductive and capacitive voltage terms whose summated resultant increases whilst arc current falls. During this transient condition the time integral of the product of current and voltage increases, this integral defining an energy that is dominantly received by the contact faces with consequent increase in surface temperature. An excessive energy input would promote conditions of thermal excitation that would allow contact faces to eject ionised carriers that would lead to a risk of re-strike. An important benefit of the present invention is that the contacts of each vacuum switch may be made to open only when the current flowing between the contacts has been reduced to substantially below the chopping current, typically within the range of about 1% to about 50% of the minimum prospective chopping current, and thus this energy input may be minimised. If the re-applied voltage increases too rapidly relative to the rate of increase of contact separation the electric field may be sufficient to cause ionised carriers to be ejected from contact faces, into the increasing space between contact and cause re-strike. It is normally essential that re-strike is avoided under dc current conditions because there is no mechanism that would subsequently extinguish the low pressure metal vapour arc. The present invention therefore defines the stray inductance and capacitance of commutating loops that attempt to minimise this energy and re-applied voltage. This is described in more detail below in the context of switching aid networks.

The dc network to which the vacuum switch assembly is electrically connected in use can have any suitable arrangement. In general terms, a primary dc power source is electrically connected to the dc network by means of a vacuum switch assembly and dc power that is fed into the dc network by the primary dc power source flows through the interposing vacuum switch assembly. The dc network may extend in one or two directions from the primary dc power source and be in the form of a suitable busbar or cable, for example, having at least first and second dc lines (e.g. one two-core dc cable or two single-core dc cables per direction, each pole being provided with a grounded shield for electric field control purposes). The first dc line of the vacuum switch assembly can be a positive pole and the second dc line can be a negative pole or vice versa. The first and second dc lines of the vacuum switch assembly can be electrically connected to the first and second dc lines of the dc network per direction by means of a respective two-pole off load isolator. The off load isolators allow a faulty dc line to be isolated. Safety earthing switches can be provided to allow the isolated dc lines to be earthed after isolation. The isolation and grounding may be performed at the location of one particular primary dc power source in which case that primary dc power source is also preferably grounded. Alternatively, the isolation may be performed at the location of one primary dc power source while the grounding is performed at the location of another primary dc power source.

In one arrangement a single vacuum switch assembly is used to connect an associated primary dc power source to the dc network. However, it will often be the case that a plurality of vacuum switch assemblies (typically having the same overall construction as described herein, but optionally having different types of vacuum switches or other components) are electrically connected to a common dc network in use. In this case each vacuum switch assembly will be used to connect an associated primary dc power source to the dc network. In a typical arrangement, the dc network might include one or more dc collection networks to which groups (or clusters) of primary dc power sources feed dc power through their associated vacuum switch assemblies.

The dc network can include a collection point which feeds power directly through a dc transmission link to a receiving converter station, or which feeds power to the transmitting converter station of a HVDC transmission link to a receiving converter station. The dc network can allow for power flow to the primary dc power source(s) and this power flow will typically be asymmetric with power flow from the dc transmission link to the primary dc power source(s) being typically less than 1% of the rated output of the primary dc power source (s). In an arrangement where more than one group (or cluster) of primary dc power sources are simply parallel connected to the dc transmission link at the collection point then the dc network will include the various group interconnections and the dc transmission link.

The collection point can receive the inter-tripping signal (see below) from each group (or cluster) and link these to form a common inter-tripping signal which is subsequently routed with the power cables of the dc transmission link.

Each primary dc power source can include an auxiliary power supply unit to feed power to its auxiliary systems, e.g. its cooling plant, and this may be drawn from the dc network through the first and second dc lines of the associated vacuum switch assembly. If a primary dc power source includes a rotating electrical machine (e.g. a generator) as described below then auxiliary power supply unit loading is also preferably sourced from within the primary dc power source at all times when the electrical machine is rotating, thereby only relying on externally supplied auxiliary power when the electrical machine is not rotating, e.g. in the case of a renewable-energy device when there is no renewable energy source available. It is generally essential that the current that is drawn from the dc network by the auxiliary power supply unit is interrupted by shutting down the auxiliary power supply unit at times when the dc network voltage is substantially lower than its normal working range, thereby preventing the auxiliary power supply unit from interfering with the sensing load line that is described in more detail below.

Each primary dc power source can include a power-generating device, e.g. a renewable-energy device of any suitable type. A typical example might be an electrical machine (e.g. a generator) which converts renewable energy such as wind, wave, tidal energy or water current flows into electrical energy by using a turbine assembly to drive the rotor of the electrical machine, either directly or by means of a gearbox. The stator terminals of the electrical machine can be electrically connected to a suitable power converter that has dc output terminals that are electrically connected to the first and second dc lines of the vacuum switch assembly in use.

If the electrical machine or other power-generating device provides a dc output at its stator terminals then it can be directly connected to a DC/DC power converter. Alternatively, if the electrical machine or other power-generating device provides an ac output at its stator terminals then it can be electrically connected to an AC/DC power converter which in turn is connected to a DC/DC power converter. The DC/DC power converter can operate as a step-up converter and can be configured to feed power into the dc network at any suitable voltage level. The dc network voltage would typically be bipolar, symmetrical about ground potential, and would typically be less than 140 kV between positive and negative dc lines. The dc input terminals of the DC/DC power converter may receive any convenient dc input voltage from the electrical machine or the interposing AC/DC power converter. The dc input voltage would typically be less than 5 kV meaning that a typical voltage boost ratio of at least 28:1 might be required. If a low voltage electrical machine was used then the dc input voltage would typically be less than 1.5 kV and so a higher voltage boost ratio would be required.

The DC/DC power converter can have any suitable construction or topology such as a transformerless type or an isolation type with a transformer, for example. In the latter case the DC/DC power converter will typically have an active inverter and a rectifier (either passive or active) connected together by a transformer which may operate at substantially greater than normal line frequencies and have any convenient number of phases, however single- and three-phase types would usually be preferred. It will be readily appreciated that transformer isolation is preferred when voltage boost ratios of greater than 3:1 are required in DC/DC power converters, but voltage boost ratios of up to 5:1 may be used in cases where this avoids the need for an isolating transformer. For example, in the case of a brushless dc electrical machine with a rated dc output voltage of 20 kV feeding power into a dc network with a symmetrical bipolar voltage of 100 kV then the DC/DC power converter could be a symmetrical transformerless type with a voltage boost ratio of 5:1.

If the electrical machine or other power-generating device provides an ac output then an AC/DC power converter of any convenient type may be used to provide the dc input voltage for the DC/DC power converter. An electrical machine may operate at variable speed and the voltage at its stator terminals may also be variable. The voltage boost ratio of the DC/DC power converter, or the combined voltage boost ratio of the AC/DC power converter and the DC/DC power converter, can be controllable in order to compensate for this.

The specified examples of voltage boost ratios are those that are applicable at the rated output of the electrical machine or other power-generating device.

As noted above, the primary dc power source can include an auxiliary power supply unit that is typically electrically connected to the dc output terminals of the DC/DC power converter, i.e. between the DC/DC power converter and the vacuum switch assembly.

The primary dc power source can also include an output filter that is typically electrically connected between the dc output terminals of the DC/DC power converter.

The dc network can have a bipolar arrangement where the first dc line carries a positive dc voltage and the second dc line carries a negative dc voltage or vice versa. In this case the DC/DC power converter of each primary dc power source will typically be adapted to provide a bipolar dc output and the associated vacuum switch assembly will be suitably adapted such that both the first and second dc lines include a vacuum switch and carry positive and negative dc voltages.

If a plurality of primary dc power sources are provided then a first proportion may have a DC/DC power converter that is adapted to provide a positive unipolar dc output and a second proportion may have a DC/DC power converter that is adapted to provide a negative unipolar dc output. The plurality of primary dc power sources are then electrically connected to the dc network by their associated vacuum switch assemblies, which are suitably adapted to carry a positive or negative unipolar dc voltage in such a way that the overall dc network has a bipolar arrangement with an additional third dc line or an earth or ground connection. Each vacuum switch assembly will be suitably adapted such that the first dc line includes a vacuum switch and carries a positive or negative dc voltage as required, and the second dc line is un-switched or vice versa. The vacuum switch assembly will also include a third dc line which is also un-switched. The un-switched dc lines of the vacuum switch assembly will typically carry a dc voltage that is zero or close to zero and are typically grounded.

The dc network can also have a unipolar arrangement where the first dc line carries a positive or negative dc voltage and the second dc line carries a dc voltage that is zero or close to zero or vice versa. In this case the DC/DC power converter of each primary dc power source will typically be adapted to provide a positive or negative unipolar dc output and the associated vacuum switch assembly will be suitably adapted such that the first dc line includes a vacuum switch and carries a positive or negative dc voltage as required, and the second dc line is un-switched and carries a voltage that is zero or close to zero or vice versa. An earth or ground connection can be used in place of a dc line in the dc network and the corresponding dc line of the vacuum switch assembly can be connected accordingly.

In general terms the first and second dc lines of each vacuum switch assembly will be electrically connected to the appropriate corresponding dc line (or an earth or ground connection) of the associated primary dc power source and the dc network in use.

The DC/DC power converter will typically be regulated by a suitable converter controller to control the output current and output voltage of the primary dc power source (i.e. the current and voltage at the dc output terminals of the DC/DC power converter which are electrically connected to the first and second dc lines of the vacuum switch assembly). In the case where the DC/DC power converter has an active inverter then the converter controller can be used to control the opening and closing of the power electronic devices of the active inverter to provide the necessary regulation. If the DC/DC power converter has an active rectifier then it could also be controlled by the converter controller. However, such an arrangement is not generally preferred because it is advantageous to use simple, robust and reliable power electronic devices that do not require gating systems in the output stage of the DC/DC power converter, and to maximise efficiency and power density. Any signals provided by the vacuum switch controller to the associated primary dc power source will typically be provided to the converter controller.

The electrical machine itself might incorporate integrated electronics. For example, the electrical machine can be a brushless dc electrical machine with an active electronic commutator circuit which might be regulated directly by a suitable machine controller. This would allow the output current of the electrical machine (and hence the output current of the primary dc power source) to be reduced to zero but would not necessarily have the ability to provide any desirable variation in the voltage boost ratio. Any regulation of the integrated electronics by the machine controller will normally be carried out to optimise the performance of the electrical machine but such regulation can also be used to protect the electrical machine and the DC/DC power converter in the event of a fault in the DC/DC power converter.

The secondary dc power source of the passive dc power supply unit is preferably a galvanically isolated low voltage source whose open circuit voltage defines a sensing voltage. The sensing voltage is preferably substantially ripple-free. The passive dc power supply unit preferably also includes a current defining resistor and at least one blocking diode. The current defining resistor of the passive dc power supply unit is connected in series with the open circuit voltage and the resistance of the resistor defines the slope resistance (i.e. dv/di or G/F from FIG. 4) and short circuit current of the passive dc power supply unit. The at least one blocking diode (typically a string of series-connected diodes) of the passive dc power supply unit is connected in series with the current defining resistor and prevents current flow from the primary dc power source and/or from the dc network to which the vacuum switch assembly is electrically connected in use. The passive dc power supply unit is preferably connected to the first and second dc lines of the vacuum switch assembly at a junction between the dc output terminals of the primary dc power source and the vacuum switches, i.e. so that the sensing voltage flows through the vacuum switches before it is fed into the dc network.

The vacuum switch controller can be adapted to open the vacuum switch contacts when the current flowing between the contacts is a non-zero current that is provided by the passive dc power supply unit.

Each vacuum switch assembly can include at least one switching aid network connected between the first and second dc lines. Each switching aid network can include a series-connected resistor and a capacitor, typically with low parasitic series inductance and low parasitic capacitance to ground. The parasitic series inductance is specified to minimise the inductive voltage drop during intentional chopping of the vacuum switches. The low parasitic capacitance to ground is therefore specified to minimise unintentional resonances between parasitic inductances throughout the interconnections between the primary dc power source, the switching aid network(s), the vacuum switches, the isolators, and the dc network. The primary dc power source is not specified to have a low parasitic series inductance except within its output filter. If only a single switching aid network is provided then it is preferably connected across the dc output terminals of the primary dc power source and may be the output filter mentioned above. The parasitic series inductance of the output filter will normally be substantially less than that of the remainder of the primary dc power source and since this low inductance is connected in parallel with the remaining components of the primary dc power source it defines a loop inductance between the dc output terminals of the primary dc power source and the corresponding terminals of the vacuum switches in the first and second dc lines. The commutating loop inductance contribution on the dc network-side of the vacuum switches must also be defined and this may involve the careful selection of the layout of the dc network cables, dc lines and off-load isolators to minimise the loop area in a manner that is consistent with the requirement to employ a high voltage insulation system. The dc network cables can be configured as bifilar pairs which inherently have a low leakage inductance and the cable conductor to shield capacitances and shield interconnections define a low impedance between the dc lines of the vacuum switch assembly at high frequencies, and particularly at frequencies that are representative of the vacuum switch chopping response. The complete commutating loop inductance therefore comprises the summation of the inductance contribution between the dc output terminal of the primary dc power source and the corresponding terminals of the vacuum switches in the dc lines on the one hand, and the dc network-side inductance on the other.

Although the current in the commutating loop decays very rapidly and the defined commutating loop inductance is sufficiently low for the inductive voltage transient to be insufficient to cause immediate re-strike in the vacuum switches, the current in the cables of the dc network cannot immediately stop flowing. The interruption of current in the dc network leads to a well known multi-resonant mode of cable behaviour where reflections occur at cable ends when terminated at other than the characteristic impedance of the cable. Accordingly, the voltage at the output end of the dc lines of the vacuum switch assembly (i.e. at the point of connection to the dc network) can include a resonant component which is shown passing through point H2 in FIG. 4. This resonant component of voltage is distributed throughout the commutating loop but the majority of the voltage is supported by the gap between the respective vacuum switch contacts once they start to open. If one vacuum switch opens substantially before the other or others, say >1 ms spread in initial contact opening, then the majority of the voltage will be experienced between the contacts of this early opening vacuum switch and its contact surfaces will receive most of the switching energy. If vacuum switches open simultaneously, say <0.5 ms spread in initial contact opening, then the voltage and associated switching energy will be approximately equally distributed across contact systems. This is why it is generally preferred that the contact opening be synchronised. When synchronised, and when current has been reduced to substantially less than the chopping current of the vacuum switches, and since all vacuum switches are effectively series connected within the specific commutating loop, when the contacts of more than one vacuum switch are open, the action of a first vacuum switch chopping, by causing a corresponding current reduction in other vacuum switches, generally causes chopping to commence in the other vacuum switches and switching energy is approximately equally distributed across all open contact systems. Since the maximum prospective short circuit current at the time of initial contact opening is substantially less than the chopping current of the vacuum switches, the stored energy in the inductive components of the commutating loop and the interconnecting cables of the dc network is low and hence the summation of the effects within the commutating loop and the cables of the dc network is such that the resonant voltage across the opening contacts of the vacuum switches is sufficiently low for re-strike to be avoided at the first resonant peak in voltage, even when the contacts of only one vacuum switch have started to open. As further contacts start to open and the contacts continue to separate then the voltage is distributed across all open contact systems and the successive resonant peak voltages decay. Therefore, the risk of re-strike diminishes and in practice is negligible after the first resonant peak.

Once the fault current has been limited to the specified maximum prospective short circuit current it is possible that the fault may become unstable or extinguish before the contacts of the vacuum switches open but the current will still be less than the specified maximum prospective short circuit current and the risk of re-strike will be avoided as a result of the defined commutating loop with switching aid network.

If a primary dc power source with a bipolar dc output experiences a ground fault then the maximum prospective current in any vacuum switch at the time of contact opening is still limited by reducing the fault current contributions from the fully functional primary dc power sources to zero as described below and then by the secondary dc power sources. However, in this case current flows in either of the vacuum switches and ground. The inductance of the commutating loop is that comprising one of the dc lines of the vacuum switch assembly and the parallel combination of the ground network and the other dc line. Although the current in the vacuum switches is limited to less than the above specified maximum prospective short circuit current, this current flows asymmetrically in one of the dc lines and substantially not in the other prior to the opening of the contacts of the vacuum switches. Once the contacts begin to open the first switching aid network and the capacitance of the cables of the dc network are fully effective in preventing re-strike.

At times when a primary dc power source is not affected by a fault and dc network voltage is at its normal working level there may be a requirement to take a primary dc power source out of service and isolate it from the dc network for maintenance or any other reason. Under these circumstances it is necessary to reduce the output current of the primary dc power source to zero as described below before the contacts of the vacuum switches are opened. Once the contacts begin to open the first switching aid network and the capacitance of the cables of the dc network are fully effective in preventing re-strike.

If a second switching aid network is provided then it preferably connected across the first and second dc lines of the vacuum switch assembly between the vacuum switches and the optional off load isolators that allow the vacuum switch assembly to be connected to the external dc network, i.e. at the network-side of the vacuum switches. The second switching aid network can have an impedance that is approximately equal to the characteristic impedance of the cables of the dc network and therefore terminates the cables in a manner that minimises or substantially eliminates the resonant effects of reflections at cable ends. The second switching aid network also provides damping for the switching transients that occur when the contacts of the vacuum switches open. Accordingly, the voltage at the output end of the dc lines of the vacuum switch assembly (i.e. at the point of connection to the dc network) includes a damped transient component which is shown passing through point H1 in FIG. 4. The distribution of this transient voltage between contacts of the respective vacuum switches and the role of the contact synchronisation is as described above for the case where only a single switching aid network is employed.

If a single vacuum switch assembly is connected to the dc network in use then the maximum prospective short circuit current in the first and second vacuum switches at the time of their initial opening is set by sensing the load line which is defined by the open circuit voltage of the secondary dc power source and the slope resistance. If a plurality of vacuum switch assemblies are connected to the dc network in use then the sensing load line is defined by the open circuit voltage of all of the secondary dc power sources and the parallel combination of their slope resistances. The number of vacuum switch assemblies, and hence the number of secondary dc power sources, that are connected in parallel to the dc network determines the maximum prospective short circuit current F in the first and second vacuum switches. Irrespective of how many vacuum switch assemblies are connected to or form part of the dc network, the maximum prospective short circuit current F at the time of their initial contact opening must be less than the chopping current of the particular vacuum switch type that is being used.

It will generally be beneficial to have passive dc power supply units in all points of connection of vacuum switch assemblies to the dc network so that the complete power system has redundancy and maintains the ability to operate the vacuum switches in the specified manner irrespective of how many primary dc power sources are on-line.

In addition to its connection to vacuum switch assemblies throughout the dc network, the collection point of the dc network can be connected to either a converter station at the power-receiving end of the dc transmission link or a converter station at the transmitting end of an HVDC transmission link. Whilst these converters will generally receive power from the dc network when a source of renewable energy is present, they must have the capability to deliver auxiliary power to the dc network as described above. The control and protection system of these converters should normally replicate the behaviour of the converter controller of a primary dc power source in order to comply with the requirement for the specified maximum prospective short circuit current F. A vacuum switch controller (or equivalent controller) may be employed for this purpose and this may receive an inter-tripping signal from the vacuum switch controllers associated with the vacuum switch assemblies. Such a controller within the receiving converter station or transmitting station of a HVDC transmission link may also be able to activate an inter-tripping signal.

Each vacuum switch assembly preferably includes at least one voltage transducer for measuring the dc voltage in at least the switched one of the first and second dc lines of the vacuum switch assembly (the line voltage). Each vacuum switch assembly also preferably includes at least one current transducer for measuring the dc current in at least the switched one of the first and second dc lines of the vacuum switch assembly (the line current). If both the first and second dc lines include a vacuum switch then each dc line will typically include a voltage transducer and a current transducer. Any description herein which refers to voltage and/or current transducers in both dc lines is, where appropriate, also to be taken to refer to a vacuum switch assembly with only voltage and current transducers in the switched dc line and no voltage and current transducers in the un-switched dc line. The various transducers provide input signals to the vacuum switch controller. As described further below, the vacuum switch controller can use the input signals from the voltage and/or the current transducers to identify a fault condition. The vacuum switch controller can also use to the input signals from the voltage and/or the current transducers to determine when the vacuum switch contacts can be opened.

The vacuum switch controller preferably has a fast-acting electronic output that is connected to the shunt trip actuator input (or equivalent) of the vacuum switches.

Each vacuum switch controller is adapted to carry out three basic control processes. The first process (the fault determination process) determines that a fault condition is present so that the vacuum switch controller can carry out certain control actions preparatory to opening the contacts of the vacuum switches to interrupt any fault current. The second process (converter control process) allows the vacuum switch controller to carry out control actions to control the converter controller of the associated primary dc power source to achieve certain conditions that are necessary for the contacts of the vacuum switches to be opened safely. The third process (the vacuum switch control process) allows the vacuum switch controller to carry out control actions to open the contacts of the vacuum switches when certain conditions have been achieved, and to close the contacts when other certain conditions have been achieved. For example, it may be necessary to carry out repair work to remove the fault before allowing the vacuum switches to close, typically in a manner which is specified to avoid the risk of pre-strike. Whereas the first and second processes are effective whether the vacuum switch controller is associated with a primary dc power source that is delivering or receiving fault current, the third process is effective only in a vacuum switch controller at the location of a fault that determines a requirement to open vacuum switches.

Each primary dc power source will typically be able to independently detect a fault condition. For example, each primary dc power source can include independent current and voltage transducers that provide input signals to the converter controller. More particularly, each primary dc power source preferably includes at least one voltage transducer for measuring the dc voltage in at least one of the dc output terminals and at least one current transducer for measuring the dc current in at least one of the dc output terminals. Each dc output terminal can include a voltage transducer and a current transducer.

The converter controller can use the input signals from the voltage and/or the current transducers to identify a fault condition. If a fault condition is identified then the converter controller can carry out appropriate control actions. For example, the converter controller can limit the output current of the DC/DC power converter then reduce its output current and output voltage to zero if a high current and low voltage condition is detected on the basis of the input signals from the current and voltage transducers. The converter controller will normally operate independently of the vacuum switch controller of the associated vacuum switch assembly apart from the circumstances outlined below, i.e. where it is controlled on the basis of an output enable signal or trip signal in the presence of an over-current fault, or when the vacuum switches must be opened in response to an operator request. Irrespective of whether a fault is present, the contacts of the vacuum switches are made to open only when the vacuum switch controller detects that the line current is very low and is most probably below the chopping current—the latter being a function of the overall system design. If the converter controller does not independently reduce the output current (and, as a result of such regulation, the output voltage) at the dc output terminals of the primary dc power source to zero then it will preferably be forced to do so by the vacuum switch controller so that the contacts of the vacuum switches can be safely opened. It will be noted that any departure from a zero output current in practice, for example caused by leakage currents, would not be intentional.

If no fault is present and primary dc power sources elsewhere maintain full output (because no inter-tripping is required) and remain connected to a primary dc power source of interest through the dc network which is also maintained at full working voltage then the primary dc power source of interest can only reduce its output current to zero while the contacts of the vacuum switches are closed because the output diodes of the primary dc power source prevent significant reverse flow and the presence of the dc network voltage causes the output of the primary dc power source to remain at that voltage. Its output current and output voltage will remain near point A of FIG. 4 until the vacuum switches of its associated vacuum switch assembly are opened, at which point they will collapse to zero. In practice the exact output current and output voltage at contact opening will be slightly below point A of FIG. 4 and voltage transients similar to H2 and H1 but much smaller in amplitude will typically occur between the dc lines and will be superimposed on the settling point near to point A. The actual settling point before the contacts of the vacuum switches are opened will have a voltage equivalent to the dc network voltage and a current that is defined by the load drawn by the auxiliary power supply unit, this load current optionally being limited by replicating the output enable circuit and trip signal functions of the converter controller of the primary dc power source as part of the auxiliary power supply unit, and in any case will be substantially less than the chopping current. Because the amplitudes of the voltage transients are a function of the current that is interrupted by the vacuum switches, and because the current is small when it is sourced by the single secondary dc power source that is associated with the primary dc power source of interest, the transient amplitudes that correspond with the use of one or two switching aid networks are small. The transients finally settle at point E of FIG. 4 after the vacuum switches have been opened.

Fault Determination Process

Each vacuum switch controller is preferably adapted to determine when a low resistance fault occurs using a decision process based on the input signals from the current and voltage transducers. A low resistance fault might be determined if a high current and low voltage condition is detected but this is case-sensitive, i.e. if the reverse line current exceeds a predetermined fault threshold and the line voltage falls below a predetermined threshold a low resistance fault is determined and this is known to exist at the location of primary dc power source with which the vacuum switch controller is associated; conversely, if the forward line current exceeds a predetermined fault threshold and the line voltage falls below a predetermined threshold a low resistance fault is determined and this is known to exist elsewhere than at the location of primary dc power source with which the vacuum switch controller is associated. This case-sensitivity is described later with reference to FIG. 5. The output of the decision process is a low resistance fault signal.

Ground faults may be detected by checking for parity between the respective pole to ground voltages using the input signals from the voltage transducers. Such a voltage parity check can incorporate the reasonableness filtering described below, typically with a time constant less than 5 ms (or its digital equivalent) and the output of the parity check process is a ground fault signal. If a ground fault signal is generated the vacuum switch controller will behave as if a low resistance fault is present.

Each vacuum switch controller may apply reasonableness filtering to all input signals which can ensure that an acceptable signal to noise ratio is achieved, and enable the mean level of a quantity that is being measured (e.g. by the current and voltage transducers) to be used in the decision processes.

Each vacuum switch controller can be implemented in hardware or a mixture of hardware and software. A digital controller will normally be preferred. In the case of a digital controller then any digital input signals (e.g. an inter-tripping signal or signals from vacuum switch auxiliary contacts) inherently have high noise immunity and would not normally need reasonableness filtering.

A passive (RC) filter with a suitable time constant (e.g. 10 ms or its digital equivalent) can be used to provide adequate noise immunity and an averaging function for the input signals that are received by each vacuum switch controller. If the vacuum switch controller is a digital controller then the passive filter can be used as an anti-aliasing filter for the converter controller, and its time constant can be reduced (e.g. to 1 ms depending on the sampling rate of the digital system).

The reasonableness filtering may incorporate an industry-standard digital filtering system.

The decision processes of the vacuum switch controller may use further filtering.

In practice, noise immunity will be achieved at the expense of a small consequential delay as the reasonableness filtering is applied to the input signals and/or any internally generated signals. These delays are related to the time constant of the passive filter, and any digital filter algorithms if used. In the event of a high current fault then the issues of signal to noise ratio and signal averaging are minimal since only large signal behaviour is important and the noise level in a high current fault is low. Consequently this aspect of the control strategy can include minimal filtering resulting in a small time delay, typically about 1 ms. When the fault current has been limited to the maximum provided by the or each secondary dc power source then small signal behaviour is important and the noise level will be relatively high. Consequently the aspect of the control strategy associated with this low fault current (which may possibly be zero in the case of a sporadic fault) can include significant additional filtering resulting in a longer time delay, typically about 20 ms.

Converter Control Process

Once a vacuum switch controller has determined a fault condition (e.g. a low resistance fault signal or ground fault signal has been generated) then it can carry out certain control actions that are designed to achieve the conditions that will allow the contacts of the vacuum switches to be opened. As described in more detail below, the same control actions can also be carried out by the vacuum switch controller in response to an operator request signal or an inter-tripping signal that is initiated by another vacuum switch controller. In other words, the control actions do not necessarily have to be initiated by the prior determination of a fault condition by the vacuum switch controller that carries them out.

Each vacuum switch controller is preferably adapted to provide two control signals to the converter controller of its associated primary dc power source. The control signals are used to control the regulatory processes that are applied by the converter controller to control the operation of the DC/DC power converter. An output enable signal preferably has two states: a first state which allows the converter controller to apply its normal regulatory processes so that the DC/DC power converter provides any suitable output current and output voltage, typically in accordance with conventional droop and current limiting characteristics, and a second state which forces the converter controller to reduce the output current and output voltage of the DC/DC power converter to zero. For example, if the converter controller receives an output enable signal in the second state then it might pulse suppress the active inverter of the DC/DC power converter or it might use pulse width modulation (PWM) and proportional control that has been forced to its limit condition if zero output can be achieved with certainty. Changing the state of the output enable signal forces the converter controller to transition between these two regulatory process conditions as soon as it is appropriate and on the assumption that the primary dc power source equipment is working properly. If a fault condition is identified or determined then the vacuum switch controller will change the state of the output enable signal from the first state to the second state so that the appropriate regulatory process is carried out by the converter controller.

If the converter controller does not regulate the output current and output voltage of the DC/DC power converter to zero within a predetermined time (e.g. 100 ms) after a fault condition has been determined by the vacuum switch controller then the vacuum switch controller can provide a trip signal to the converter controller. The trip signal is intended to actively prevent the DC/DC power converter from feeding any output current into the dc network through the vacuum switch assembly. This goes beyond simply forcing the converter controller to carry out its normal regulatory processes for reducing output current and output voltage to zero during a fault condition and may involve disconnecting the gating power supply from the power electronic devices of the active inverter of the DC/DC power converter or the like.

Removing the trip signal can optionally require some form of manual reset.

It is also possible for these control actions to be carried out in response to an operator request as well as in response to the determination of a fault condition. It may be the case that an operator simply decides that the vacuum switches of a particular vacuum switch assembly should be opened even through no fault condition (e.g. an over-current) is present. In this case the vacuum switch controller may receive an operator request signal which instructs it to carry out certain control actions that are equivalent to those carried out when a fault condition has been determined. On receipt of the operator request signal the vacuum switch controller is preferably adapted to change the state of the output enable signal that it provides to its associated converter controller from the first state to the second state. This ensures that the appropriate regulatory process is carried out by the converter controller.

If the converter controller does not regulate the output current of the DC/DC power converter to zero within a predetermined time (e.g. 100 ms) after the operator request signal has been received then the vacuum switch controller can provide a trip signal to the converter controller.

Vacuum Switch Control Process

Once the vacuum switch controllers have initiated the control actions associated with the converter control process then the vacuum switch controller that is associated with the primary dc power source at which the fault is located will normally carry out further control actions to open the contacts of the vacuum switches when certain conditions have been achieved. More particularly, the contacts of the vacuum switches are made to open only when the vacuum switch controller detects that the line current is very low and most probably below the chopping current.

Once the vacuum switch controller has determined that it is safe for the contacts of the vacuum switches to be opened (e.g. using a decision process based on the input signals provided by the current transducers) then a signal can be sent from the fast-acting electronic output of the vacuum switch controller to the shunt trip actuator input (or equivalent) of the vacuum switches to instruct the contacts to open in the conventional manner.

It is generally preferred that the contacts of the vacuum switches are made to open only after the vacuum switch controller has activated a fail-safe inter-tripping signal that ensures that the dc network voltage and current cannot accidentally increase while the vacuum switches are opening. (This is typically true for all cases where the vacuum switches are being opened in response to a fault condition but not necessarily when the vacuum switches are being opened in response to an operator request, i.e. when an operator decides for whatever reason to take a primary dc power source off-line that is fault-free and operating normally. In this case the primary dc power source that is connected to the vacuum switch assembly is able to reduce its output current to zero without the assistance of other primary dc power sources and therefore the inter-tripping signal does not need to be activated.) In practice there can be a predetermined delay between the inter-tripping signal being initiated by the vacuum switch controller and it instructing the contacts of the vacuum switches to open. The use of an inter-tripping signal is particularly important in an arrangement where a plurality of primary dc power sources feed dc power into the dc network through associated vacuum switch assemblies.

Each vacuum switch controller can preferably initiate and receive an inter-tripping signal. A conventional common fail-safe system can be used where the vacuum switch controllers are connected together using copper or fibre optic cables.

It may be preferred that any circumstances that require the contacts of the vacuum switches to be opened by a vacuum switch controller result in an inter-tripping signal being initiated by the vacuum switch controller including inter alia: (i) an operator decision that affects a primary dc power source that is operating normally—this being entirely optional for the reasons set out above, (ii) any fault condition that affects a primary dc power source and which does not lead to over-current or voltage asymmetry in the dc network, (iii) a symmetrical over-current fault in the primary dc power source, (iv) an asymmetrical fault whose current is dependent upon the grounding strategy—not necessarily a high fault current—and which leads to dc network voltage asymmetry. Some circumstances need not result in an inter-tripping signal being initiated including inter alia: (i) an operator decision that affects a primary dc power source that is operating normally—this being entirely optional for the reasons set out above, (ii) a symmetrical over-current fault in the dc network, and (iii) an asymmetrical fault in the dc network. Faults that occur in the dc network, e.g. a cable fault or a fault at a collection point, can normally only be isolated by other means. However, the specified regulation of the output current and output voltage of the primary dc power sources and the effect of the secondary dc power sources will be to minimise the propagation of damage at the fault location. Such a fault must be detected by other means. After fault detection and the shutting down of the primary dc power sources by other means, the off load isolators and grounding switches between the first and second dc lines of the vacuum switch assemblies and the dc network can be used to isolate the fault and allow the dc network to become operational again.

The operation of each vacuum switch controller does not depend on the type of fault or its location. In other words, each vacuum switch controller will perform the necessary control actions and open the contacts of the vacuum switches if necessary irrespective of the type of fault that is causing the fault current to be developed. Each vacuum switch controller may have to deal with a wide range of different fault types. For example, the faults may be symmetrical or asymmetrical and the action of limiting current before opening the contacts of the vacuum switches can cause some arcing faults to extinguish, for example flashover between busbars, hence why it is important to refer to a maximum prospective short circuit current at contact opening. Some faults may be sporadic and this is why it is normally preferred that the vacuum switch controller that is directly associated with the fault location initiates the fail-safe inter-tripping signal to all other vacuum switch controllers to make sure that the primary dc power sources in all other locations do not contribute output current and that only the secondary dc power sources contribute current. Whatever the type of fault, the maximum prospective current at contact opening serves to define the limit case current at the time when the contacts of the vacuum switches are opened. The vacuum switches will open safely at any current level below the defined maximum.

The inter-tripping signal is normally initiated by the vacuum switch controller at the location of the vacuum switches that are to be opened, irrespective of whether this is in response to the determination of a fault condition by the vacuum switch controller or optionally by an operator request. After the contacts of the vacuum switches have been opened and the fault current has been interrupted then the inter-tripping signal may be removed by the same vacuum switch controller, typically when certain interlocking conditions have been satisfied. For example, the inter-tripping signal line can be held in a trip state until two or optionally three interlocking conditions are satisfied. The first interlocking condition is when auxiliary contacts in the vacuum switches signal that the vacuum switches in the first and second dc lines have physically opened to their full extent. The second inter-locking condition is when the output of a time delay function which is triggered when the vacuum switches that are instructed to open indicates that adequate vacuum switch recovery time has passed.

When the first and second interlocking conditions have been satisfied then the fault has been safely cleared and the vacuum switches that have been opened to isolate the fault current are able to support their rated blocking voltage, i.e. the low pressure metal vapour arcs have extinguished or recovered and there is no risk of vacuum switch re-strike. The third interlocking condition is optional and is when the dc voltage between the dc lines of the vacuum switch assembly has recovered to approximately the open circuit voltage of the secondary dc power source. This optional interlocking condition could be implemented on the basis of input signals from the voltage transducers or a suitable voltage recovery sensor, for example. The inter-tripping signal can then be de-activated.

If a vacuum switch controller receives an inter-tripping signal then it will carry out certain control actions that are equivalent to those carried out when a fault condition has been determined (i.e. the converter control process). However, the contacts of the vacuum switches are not opened by the vacuum switch controller that receives the inter-tripping signal unless a separate fault condition is determined. On receipt of an inter-tripping signal each vacuum switch controller is preferably adapted to change the state of the output enable signal that it provides to its associated converter controller from the first state to the second state. This ensures that the appropriate regulatory process is carried out by the converter controller.

If the converter controller does not regulate the output current and output voltage of the DC/DC power converter to zero within a predetermined time (e.g. 100 ms) after the inter-tripping signal has been received then the vacuum switch controller can provide a trip signal to the converter controller.

The effect of the inter-tripping signal is therefore to ensure that all of the primary dc power sources that are connected to the dc network are regulated to reduce their output current and output voltage to zero.

Once the fault has been safely cleared and the vacuum switches that have isolated the fault are able to support their rated blocking voltage, i.e. the low pressure metal vapour arcs have extinguished or recovered, then there is no risk of vacuum switch re-strike. The inter-tripping signal can then be de-activated thereby signalling that the dc network voltage may be restored and that the vacuum switch controllers can change the state of the output enable signal from the second state to the first state so that the normal regulatory processes can be resumed by the converter controller. It will be readily appreciated that there may be occasions where two or more vacuum switch controllers are forced to simultaneously carry out protective actions and it will not normally be possible to de-activate the inter-tripping signal if a separate inter-tripping signal is being activated by another vacuum switch controller. In other words, the activation of an inter-tripping signal by one vacuum switch controller will normally take precedence over the attempted de-activation by another.

When the primary dc power source is to be placed on-line for the first time after a fault has safely cleared, or any necessary repairs have been made, its dc output terminal voltage must be increased to approximately the level of the dc network voltage before the contacts are closed in order to eliminate the risk of pre-strike while a high voltage is present between the contacts of the vacuum switches. Although avoiding pre-strike is important, as is inrush current minimisation, it can be desirable to close the contacts under conditions where current will not be zero because the contact faces are cleaned and conditioned by this process. In order to place a primary dc power source on-line the vacuum switch controller applies the output enable signal in the first state to the converter controller. After the output voltage of the primary dc power source has increased to approximately rated conditions the converter controller can signal to the vacuum switch controller that this condition has been reached and the vacuum switch controller can then instruct the contacts of the vacuum switches to close. Once the primary dc power source is on-line then the normal regulatory processes are carried out by the converter controller and any machine controller.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
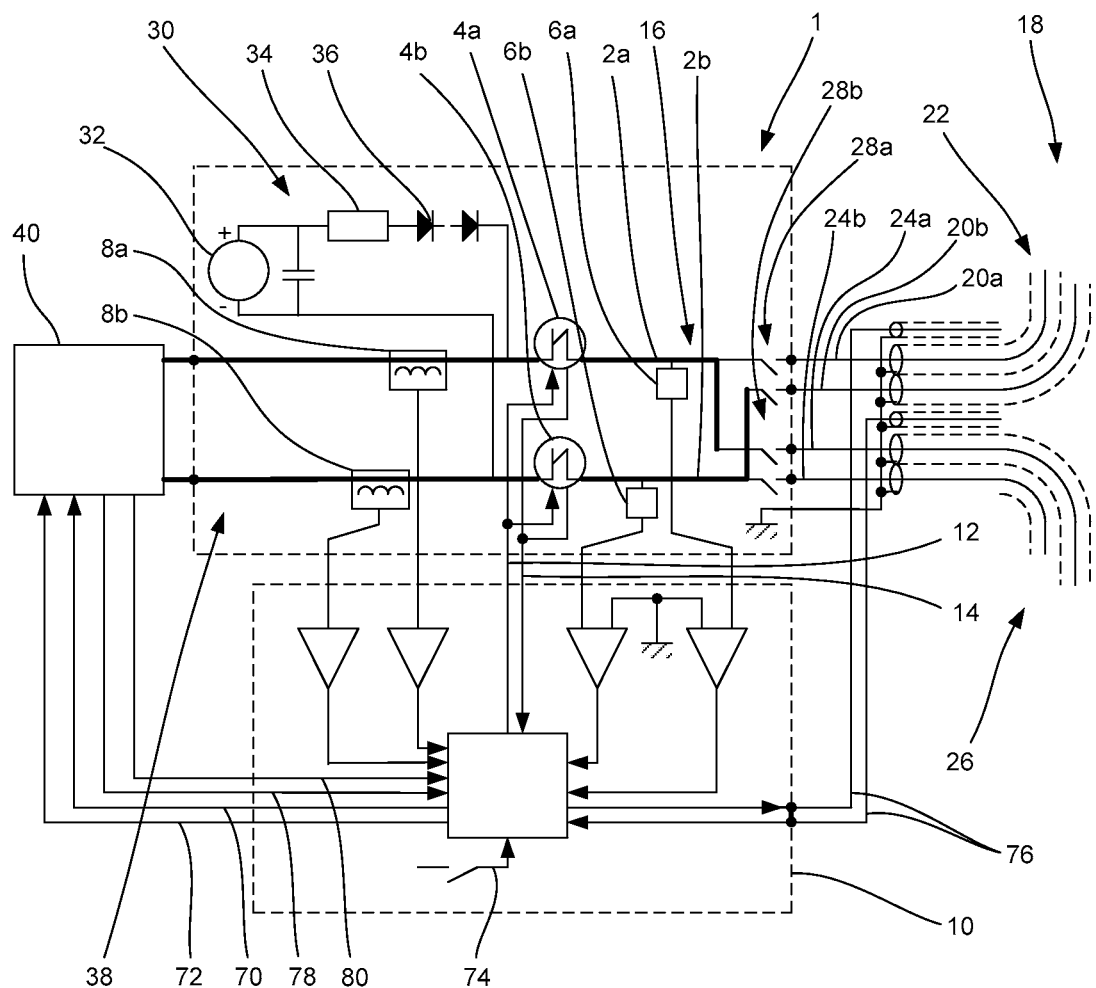
FIG. 1 is a schematic view of a vacuum switch assembly according to the present invention connected in use to a primary dc power source and a dc network.

With reference to FIG. 1 a vacuum switch assembly 1 according to the present invention includes a first dc line 2a carrying a positive dc voltage and a second dc line 2b carrying a negative dc voltage. It will be readily appreciated that such a vacuum switch assembly is inherently suitable for a dc network 18 having a bipolar dc arrangement but that other arrangements are also possible as described above.

The first dc line 2a includes a first vacuum switch 4a, a voltage transducer 6a and a current transducer 8a. The second dc line 2b includes a second vacuum switch 4b, a voltage transducer 6b and a current transducer 8b. The voltage transducers 6a, 6b measure the dc voltage in the dc lines 2a, 2b (the line voltage) and provide input signals to a vacuum switch controller 10. The current transducers 8a, 8b measure the dc current in the dc lines 2a, 2b (the line current) and provide input signals to the vacuum switch controller 10. In the case of a unipolar dc arrangement (not shown) then the second dc line might be an un-switched dc line without a vacuum switch, voltage transducer or current transducer. In this case the first dc line would carry a positive or negative dc voltage and the second dc line would carry a dc voltage that is zero or close to zero. The vacuum switch assembly might also include an un-switched third dc line which would carry a dc voltage that is zero or close to zero.

The vacuum switches 4a, 4b are of a conventional type that is typically designed to be used for ac applications and with contacts that are opened under the control of the vacuum switch controller. More particularly, the vacuum switch controller 10 can include a fast-acting electronic output that is connected to the shunt trip actuator input, or equivalent, of each vacuum switch. A signal 12 can be sent from the fast-acting electronic output of the vacuum switch controller to the shunt trip actuator inputs, or equivalents, to trigger the mechanical actuator system of the vacuum switches as shown in FIG. 1.

Input signals 14 from the vacuum switches 4a, 4b are provided to the vacuum switch controller 10. The input signals 14 are provided by the auxiliary volt-free contacts of the vacuum switches 4a, 4b whose motion is mechanically linked to the actuator of the main contacts that are used to interrupt fault current. The auxiliary contacts are series connected and close when the main contacts have fully opened. The use of normally open auxiliary contacts provides a fail-safe indication of main contact operation.

An output end 16 of the first and second dc lines 2a, 2b is connected to a bipolar dc network 18. More particularly, the output end 16 of the first dc line 2a is connected to a first dc line 20a of a first two-core cable 22 and a first dc line 24a of a second two-core cable 26, and the output end of the second dc line 2b is connected to a second dc line 20b of the first two-core cable 22 and a second dc line 24b of the second two-core cable 26. The first and second cables 22, 26 run in different directions and typically form part of a larger dc network as will be described in more detail below. The connections between the output end 16 of the first and second dc lines 2a, 2b and the dc network 18 are made through two-pole off load isolators 28a, 28b.

The vacuum switch assembly 1 includes a passive dc power supply unit 30 that includes a galvanically isolated low voltage source 32 (a so-called secondary dc power source) whose open circuit voltage defines a sensing voltage. A current defining resistor 34 is electrically connected in series with the open circuit voltage and the resistance of the resistor defines the slope resistance (i.e. dv/di or G/F from FIG. 4) and short circuit current of the passive dc power supply unit. A string of series-connected blocking diodes 36 is electrically connected in series with the current defining resistor 34 and prevents current flow from the primary dc power source 40 and/or from the dc network 18. The passive dc power supply unit 30 is electrically connected across the first and second dc lines 2a, 2b of the vacuum switch assembly on the primary dc power source-side of the vacuum switches 4a, 4b. The passive dc power supply unit 30 ensures that the vacuum switches 4a, 4b have a high probability of opening at a non-zero current which provides a contact cleaning function and at a current that is always substantially below the chopping current, thereby limiting transient recovery voltage whilst minimising contact face erosion. The open circuit voltage of the passive dc power supply 30 can optionally be used to detect that the vacuum switches 4a, 4b have regained an ability to block voltage and that it is safe for the dc network voltage to be re-applied.

Figure 2:
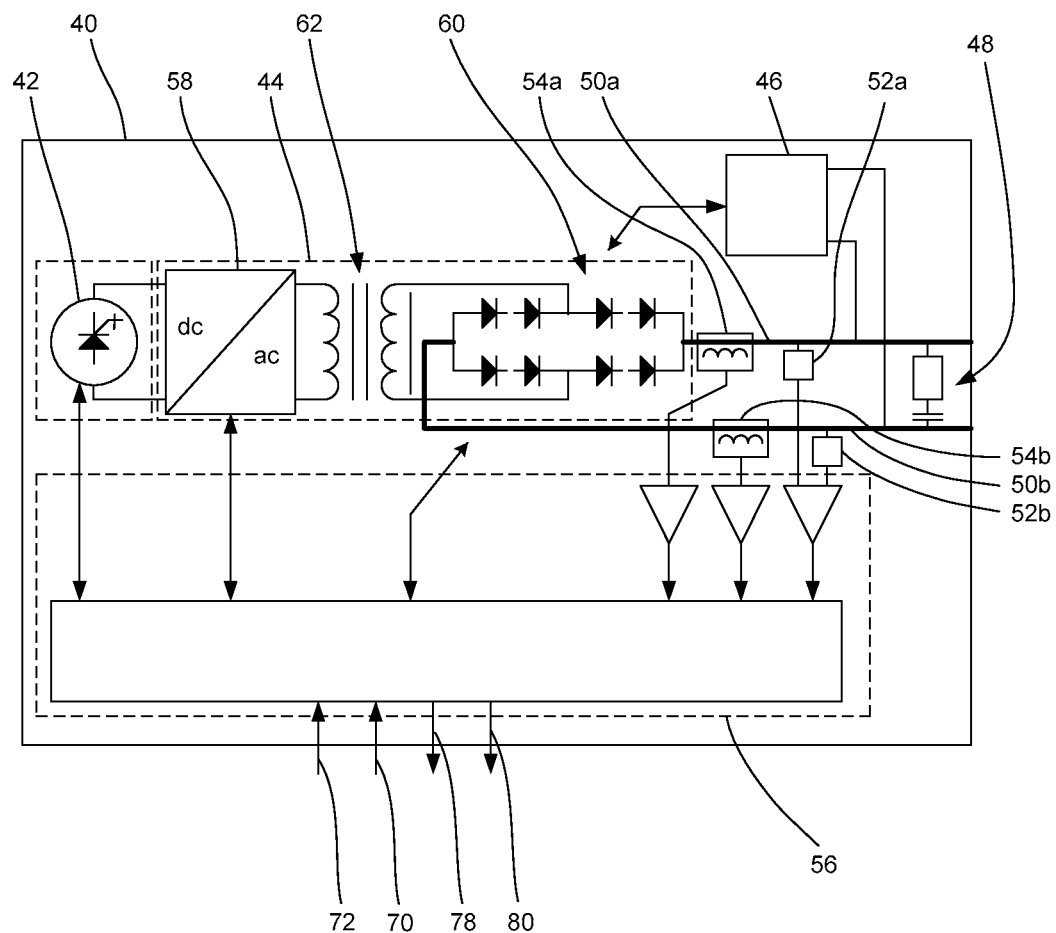
FIG. 2 is a schematic view of a primary dc power source.

An input end 38 of the first and second dc lines 2a, 2b is connected to the dc output terminals of a primary dc power source 40. An example of a primary dc power source 40 is shown in FIG. 2 and includes an electrical generator 42 which provides a dc output at its stator terminals, a DC/DC power converter 44, an auxiliary power supply unit 46 and an output filter 48 electrically connected across the dc output terminals of the primary dc power source. A first dc line 50a of the primary dc power source includes a voltage transducer 52a and a current transducer 54a. A second dc line 50b of the primary dc power source includes a voltage transducer 52b and a current transducer 54b. The first and second dc lines 50a, 50b are connected to the dc output terminals of the DC/DC power converter 44, or more particular to the dc output terminals of the passive rectifier 60. The voltage transducers 52a, 52b measure the dc voltage in the dc lines 50a, 50b and provide input signals to a converter controller 56. The current transducers 54a, 54b measure the dc current in the dc lines 50a, 50b and provide input signals to the converter controller 56. The auxiliary power supply unit 46 can be used to provide power to various auxiliary systems of the electrical generator 42, e.g. its cooling plant, and this may be drawn from the dc network 18 through the associated vacuum switch assembly 1. The auxiliary power supply unit 46 includes a battery back-up and can tolerate brief interruptions in its dc input voltage.

The output filter 48 can function as a switching aid network for the electrically connected vacuum switch assembly 1.

The electrical generator 42 can have any suitable construction, e.g. a direct drive brushless dc generator. In the case of a renewable-energy device then the electrical generator might convert renewable energy such as wind, wave, tidal energy or water current flows into electrical energy by using a turbine assembly (not shown) to drive the rotor of the electrical generator, either directly or by means of a gearbox. Linear electrical generators can be used to convert reciprocating movement into electrical energy. In practice the electrical generator might be replaced by any other suitable power generating device.

The DC/DC power converter 44 includes an active inverter 58 with a plurality of power electronic devices with any suitable topology (e.g. a current source series-parallel resonant H bridge with frequency and/or phase control) that are operated under the control of the converter controller 56. The ac terminals of the active inverter are electrically connected to the ac terminals of a passive rectifier 60 by a medium frequency transformer 62.

The auxiliary power supply unit 46 of the primary dc power source 40 is electrically connected across the dc terminals of the passive rectifier 60 in parallel with the output filter 48.

Figure 3:
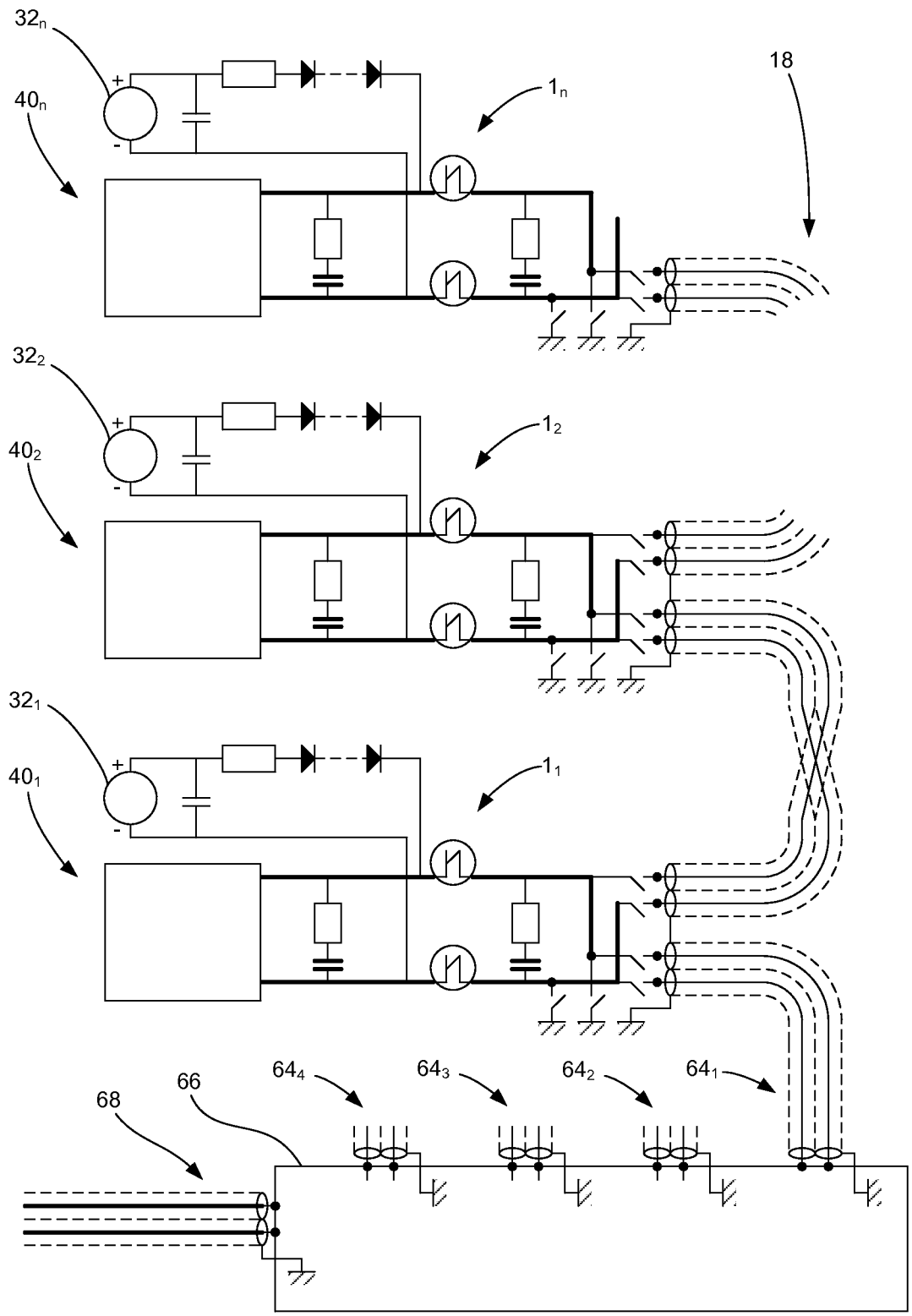
FIG. 3 is a schematic view of an arrangement where groups (or clusters) of primary dc power sources are connected to a dc network which includes a collection point and a dc transmission link.

In practice, groups (or clusters) of primary dc power sources will be electrically connected in parallel to the dc network 18 as shown in FIG. 3. The dc network 18 can have any suitable number of groups (or clusters). Each group (or cluster) will consist of any suitable number of primary dc power sources 40 that are connected to a dc collection network by means of an associated vacuum switch assembly 1. FIG. 3 shows a dc network 18 with four dc collection networks $64_1$, $64_2$, $64_3$, $64_4$ that are connected to a collection point 66 which is shown in more detail in FIG. 6. A first dc collection network $64_1$ includes n primary dc power sources $40_1, 40_2 \ldots 40_n$ connected to n vacuum switch assemblies $1_1$, $1_2 \ldots 1_n$. The first dc collection network $64_1$ therefore includes n secondary dc power sources $32_1, 32_2 \ldots 32_n$, each secondary dc power source forming part of a passive dc power supply unit of the associated vacuum switch assembly. It will be readily appreciated that the other dc collection networks $64_2 \ldots 64_n$ can be similar constructed with a suitable number of primary dc power sources. The collection point 66 is connected to the end of a dc transmission link 68.

Each vacuum switch controller 10 includes fast-acting electronic outputs that are connected to inputs of the associated converter controller 56. Signals can be sent from the outputs of each vacuum switch controller 10 to control regulatory processes that are applied by the associated converter controller 56 to control the operation of the DC/DC power converter 44. More particularly, each vacuum switch controller 10 can send an output enable signal 70 having a first state (e.g. set high in order to provide fail-safe operation) which allows the converter controller 56 to apply its normal regulatory processes so that the DC/DC power converter 44 provides any suitable output current and output voltage in accordance with conventional droop and current limiting characteristics, and a second state (e.g. set low) which forces the converter controller to reduce the output current and output voltage of the DC/DC power converter to zero. If a fault signal is generated or a fault is latched within the vacuum switch controller 10 which indicates that a fault condition has been identified or determined then the vacuum switch controller will change the state of the output enable signal from the first state to the second state (e.g. from high to low) so that the appropriate regulatory process is carried out by the converter controller 56.

If the associated converter controller 56 does not regulate the output current and output voltage of the DC/DC power converter 44 to zero within a predetermined time (e.g. 100 ms) after a fault condition has been determined by the vacuum switch controller 10 then the vacuum switch controller can provide a trip signal 72 to the converter controller. The trip signal 72 (low=trip for fail-safe operation) is intended to actively prevent the DC/DC power converter 44 from feeding any output current into the dc network 18 through the vacuum switch assembly 1.

The output enable and trip signals 70, 72 are optionally also provided to the auxiliary power supply unit 46 that is connected in parallel with the output filter 48 and which typically draws a fraction of 1 A when loaded. The output enable and trip signals 70, 72 can force the auxiliary power supply unit 46 to reduce the current that is drawn to a negligible level relative to the chopping current of the vacuum switches 4a, 4b.

An operator request signal 74 can be provided to each vacuum switch controller 10 if an operator decides that the vacuum switches 4a, 4b of a particular vacuum switch assembly 1 should be opened even through no fault condition (e.g. an over-current) is present. If a vacuum switch controller 10 receives an operator request signal 74 then it will carry out certain control actions that are equivalent to those carried out when a fault condition has been determined. For example, on receipt of the operator request signal the vacuum switch controller 10 will change the state of the output enable signal 70 that it provides to its associated converter controller 56 from the first state (e.g. set high) to the second state (e.g. set low). This ensures that the appropriate regulatory process is carried out by the converter controller 56.

Figure 6:
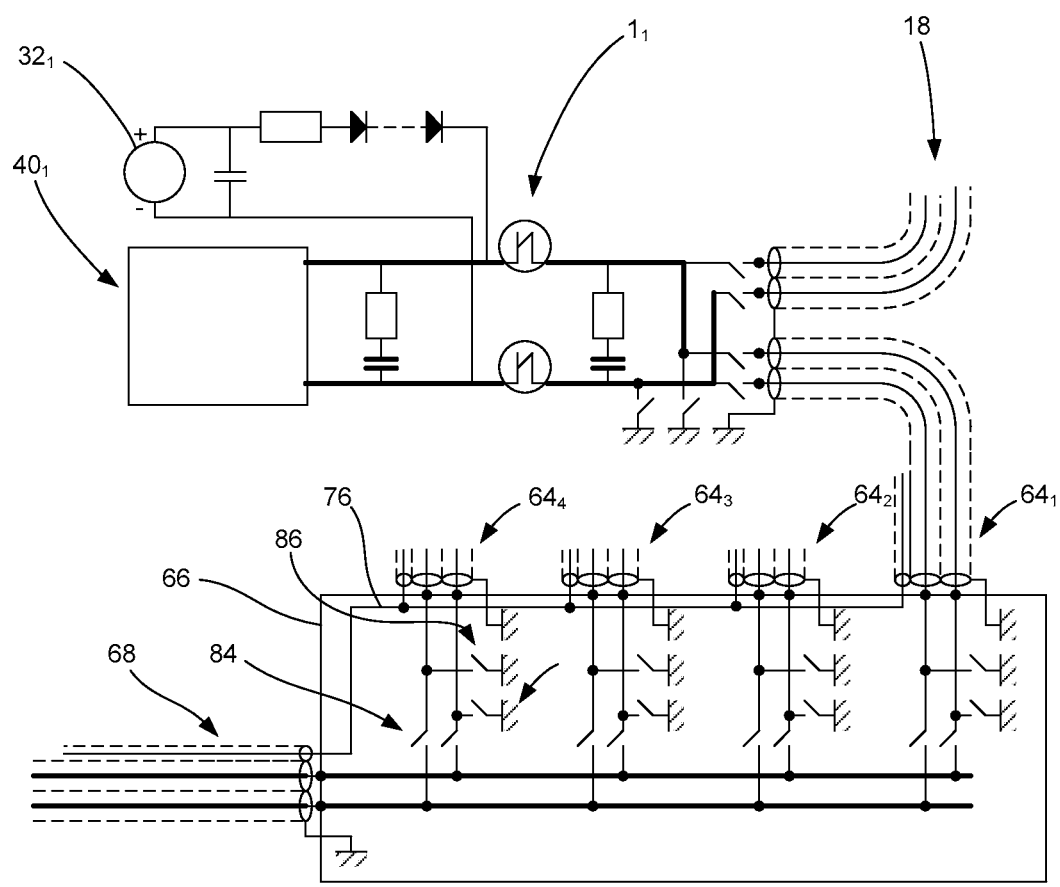
FIG. 6 is a schematic view of a collection point of a dc network.

Each vacuum switch controller 10 can initiate and receive an inter-tripping signal 76 which is provided throughout the routes taken by the first and second two-core cables 22, 26 of the corresponding dc network 18 and any individual dc collection networks. More particularly, a conventional common fail-safe system is used where the vacuum switch controllers 1 are connected together using copper or fibre optic cables which may optionally be integrated within the lay up of the first and second two-core cables 22, 26. Note that the cables that carry the inter-tripping signal 76 have been omitted from FIG. 3 for clarity and that a copper cable implementation of the inter-tripping signal system is shown in FIGS. 1 and 6.

Each vacuum switch controller 10 will carry out the fault determination process, converter control process and vacuum switch control process described above on the basis of the input signals from the current and voltage transducers 8a, 8b, 6a and 6b, using reasonableness filtering where appropriate.

The regulatory processes that are applied to the primary dc power source 40 are described below with reference to FIG. 4. The following description assumes an arrangement in which n primary dc power sources $40_1, 40_2 \ldots 40_n$ are connected in parallel to a dc network (e.g. to the first dc collection network $64_1$ shown in FIG. 3), but it will be readily appreciated that the same regulatory processes are applied to an arrangement with a single primary dc power source but with the necessary simplification of no inter-tripping and a single secondary dc power source. The following description also concentrates on the first dc collection network $64_1$ but the same description will apply mutatis mutandis to the other dc collection networks $64_2 \ldots 64_n$ of the dc network 18 and to the connected primary dc power sources and vacuum switch assemblies.

Figure 4:
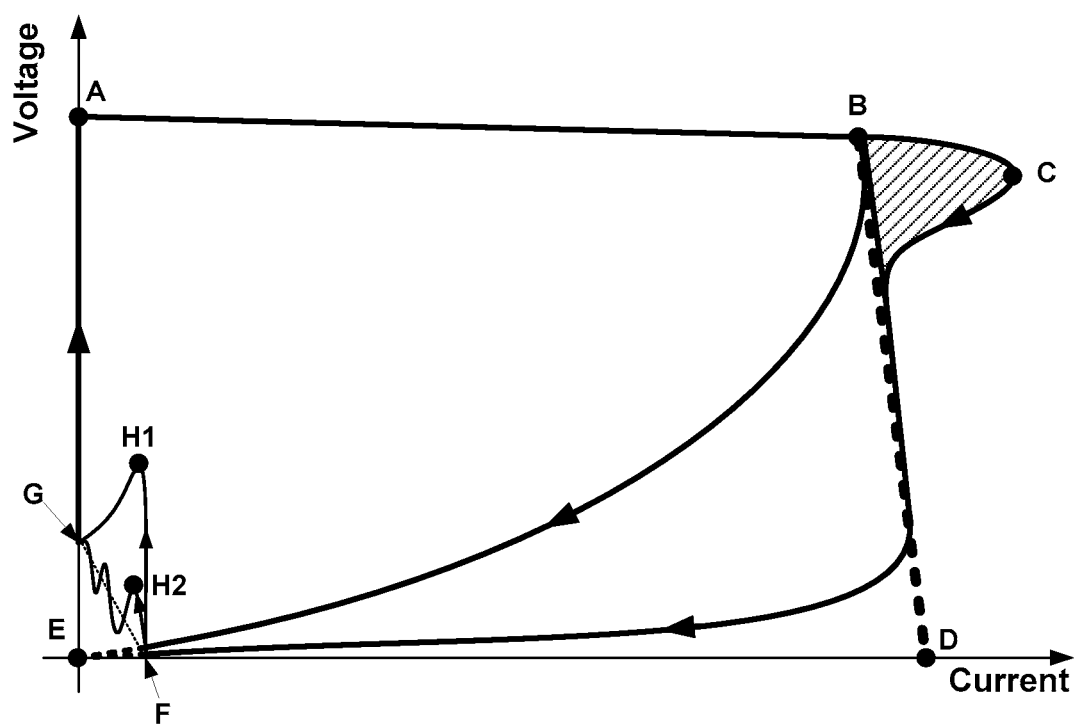
FIG. 4 is a diagram showing the current and voltage characteristics for the output of the DC/DC power converter of the primary dc power converter.
Figure 5:
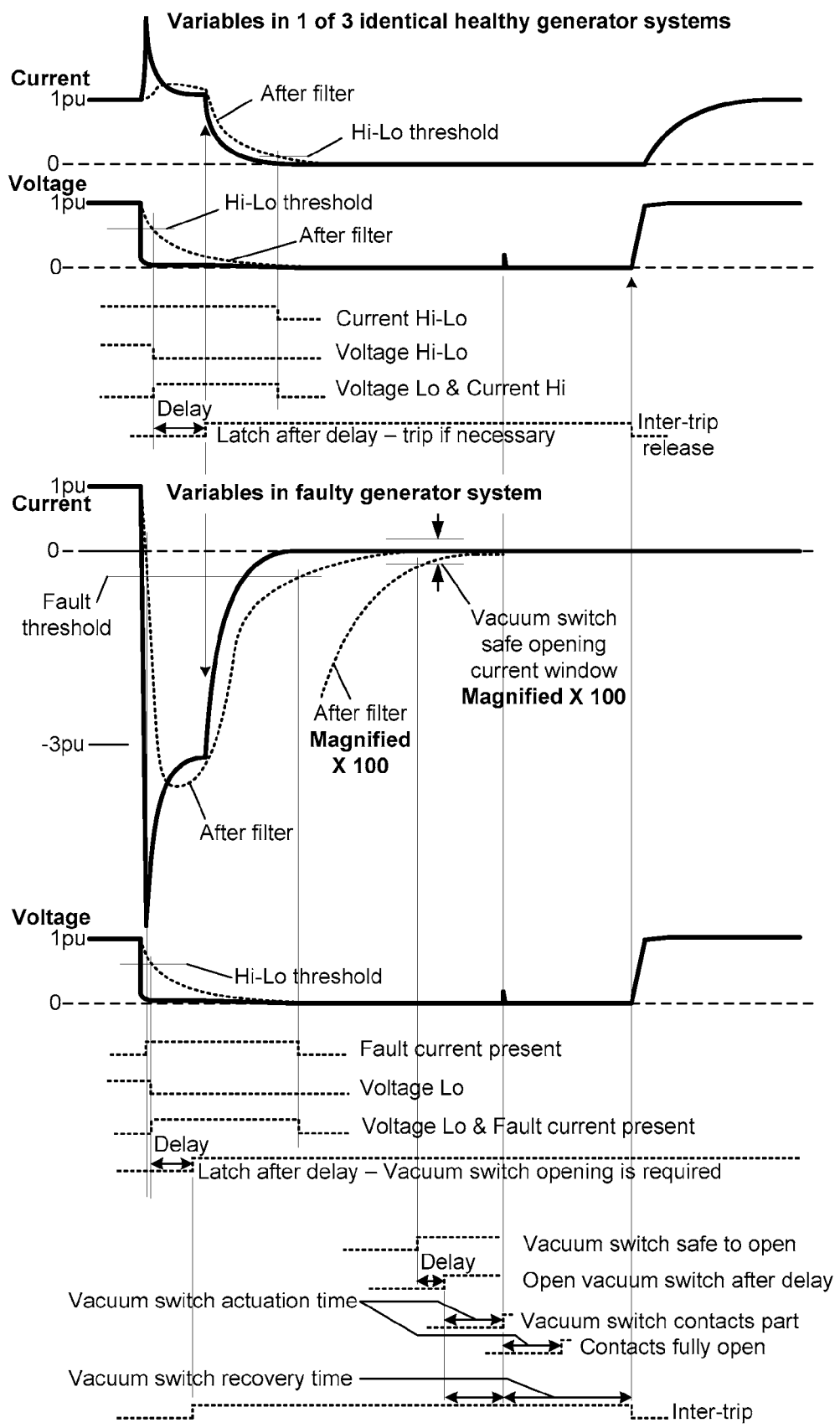
FIG. 5 is a timing diagram showing vacuum switch assembly control processes.

It will be readily appreciated that FIG. 4 is not to scale. In particular, the voltage transients H2 and H1 are not to scale but in practice it might be expected that they can be limited to less than 0.1 pu of the voltage at point A. Points G and F are also not to scale and may be as little as 50 V in a 100 kV system or 2 A in a 1200 A system, respectively. It will also be readily appreciated that points A to H are shown in the polarity that would be experienced by primary and secondary dc power sources that contribute current into a fault. As can be seen in FIG. 5 the polarity of fault current that flows in a faulty primary dc power source is opposite to that which flows in a primary dc power source that is operating normally. The magnitude of points B, C, D and F in the faulty primary dc power source will be influenced by the number of primary dc power sources and secondary dc power sources that are connected in parallel at any time by the dc network. Finally, switching transients that may occur about point A when the vacuum switch contacts are opened in a vacuum switch assembly associated with a primary dc power source that is operating normally (i.e. a healthy primary dc power source) have been omitted for clarity.

When a primary dc power source 40 is to be placed on-line when no fault is present then the associated vacuum switch controller 10 places the output enable signal 70 to the first state (e.g. set high) and when the primary dc power source 40 has reached its normal working voltage (voltage equalisation) then vacuum switch controller 10 receives a signal 78 from the converter controller 56 indicating that it is at rated conditions. The primary dc power source 40 can optionally use its battery-backed auxiliary power supply unit 46 to perform voltage equalisation. While under these conditions, providing the dc network voltage is normal and an inter-tripping signal is not activated elsewhere then the vacuum switch controller 10 sends a signal 12 to instruct the contacts of the vacuum switches 4a, 4b to close. Inrush current is minimised as a result of the prior equalisation of output and dc network voltages. The primary dc power source 40 is now on-line.

If an attempt is made to place a primary dc power source 40 on-line when a low resistance fault is present between the dc output terminals of the primary dc power source, or when another fault prevents the output voltage from increasing to its normal working voltage, then voltage equalisation does not occur. The vacuum switch controller 10 does not receive the signal 78 from the associated converter controller 56 indicating that it is at rated conditions and the contacts of the vacuum switches 4a, 4b are not closed.

The converter controller 56 can provide the vacuum switch controller 10 with a signal 80 indicating that there is a fault in the electrical generator 42 or DC/DC power converter 44 which, while having the potential to be serious, has not yet caused an over-current fault or other operational problem. An example might be a smoke detector trip or a failure of an internal system within a wind turbine tower or nacelle.

During normal operating conditions, the on-line primary dc power sources $40_1, 40_2 \ldots 40_n$ that are connected to the first dc collection network $64_1$ are preferably regulated in accordance with conventional droop and current limiting characteristics, i.e. the line between points A and B in FIG. 4. However, if a fault condition is determined by a primary dc power source 40 (e.g. using the input signals from the current and voltage transducers 52, 54 or feedback signals that are typically provided for its normal regulatory processes to identify the simultaneous presence of a high output current and low output voltage indicating a low resistance fault), the primary dc power source can be regulated to reduce its output current and output voltage to zero. The regulatory processes applied by the converter controller 56 of each primary dc power source $40_1, 40_2 \ldots 40_n$ during normal operating conditions can therefore be overridden by the converter controller in the presence of a fault condition. The current drawn by the auxiliary power supply unit 46 may also be reduced as described above.

If a low resistance fault occurs in a primary dc power source 40 that is connected to the first dc collection network $64_1$ then all of the primary dc power sources $40_1, 40_2 \ldots 40_n$ will be regulated accordingly since they are all connected in parallel. For example, the output current of the primary dc power sources $40_1, 40_2 \ldots 40_n$ will increase to current limit levels and after a transient overshoot to point C the output voltage and output current will settle to a point on the current limit line between points B and D according to the location and nature of the low resistance fault. Having detected the presence of a low resistance fault, the output current and the output voltage of the primary dc power sources $40_k$, $40_2$ ... $40_n$ will be regulated to zero (i.e. the point E) as rapidly as is practical (typically <100 ms) without tripping and the primary dc power sources remain in a condition where a rapid return to normal loaded operation would be possible.

The vacuum switch controllers 10 are adapted to determine independently when a low resistance fault occurs using the fault determination process set out above. If a low resistance fault signal is generated by a vacuum switch controller 10 then the vacuum switch controller will change the state of the output enable signal 70 that is provided to the converter controller 56 of its associated primary dc power source 40 from the first state (e.g. set high) to the second state (e.g. set low), i.e. to force the converter controller to reduce the output current and output voltage of the DC/DC power converter 44 to zero. If the converter controller 56 does not regulate the output current and output voltage of the DC/DC power converter 44 to zero within a predetermined time (typically <100 ms) after a low resistance fault has been identified then the vacuum switch controller 10 can provide a trip signal 72 to the converter controller 56.

The secondary dc power sources $32_1$, $32_2$ ... $32_n$ continuously feed dc power to the dc network 18 through the associated vacuum switch assemblies $1_1$, $1_2$ ... $1_n$ when the output voltage of the primary dc power source is reduced to zero, or more precisely is reduced below the open circuit voltage of the secondary dc power sources, the vacuum switches 4a, 4b are closed, and the dc network voltage is less than the open circuit voltage of the secondary dc power sources.

If a low resistance fault is present between the dc lines of the first dc collection network $64_1$ or is present in a primary dc power source 40 whose vacuum switch assembly is closed then this dc power will be fed into the fault and the secondary dc power sources $32_1$, $32_2$ ... $32_n$ will provide a dc current that corresponds to the intercept of its sensing load line and the dc network voltage.

Depending on the nature of the fault and the number of secondary dc power sources $32_1$, $32_2$ ... $32_n$ that are connected to the first dc collection network $64_1$ then the voltage and current within the fault may settle anywhere between the two extremities of the sensing load line which is defined between point G, which is the dominant open circuit voltage of the secondary dc power sources, and point F, which is the maximum prospective sensing short circuit current and is equal to the sum of the maximum prospective short circuit currents of the respective secondary dc power sources as defined by the current defining resistor 34 of each secondary dc power source $32_1$, $32_2$ ... $32_n$. (In practice it is likely that each secondary dc power source $32_1$, $32_2$ ... $32_n$ may provide a slightly different open circuit voltages since they are subject to tolerances, perhaps 10% spread and so the open circuit voltage with the highest magnitude within the range of open circuit voltages will dominate the dc network voltage under absolutely open circuit conditions since the blocking diodes 36 of the other passive dc power supply units 30 will not conduct. As load resistance on the dc network is reduced then the mean of the open circuit voltages will dominate. The tolerance of the resistors 34 of the passive dc power supply units 30 and the variation in forward voltage drop in the blocking diodes 36 will also effect the maximum prospective sensing short circuit current, particularly when variation in the number of primary dc power sources 40 that are actually on-line is taken into consideration.) Whilst it will be readily appreciated that it is not necessary to continuously regulate the sensing current it is essential that the maximum prospective sensing short circuit current is limited to a level that is less than the chopping current of the vacuum switches 4a, 4b that is applicable to contact operating conditions that follow short periods (typically <100 ms) during which current has been brought down to a level that is insufficient to maintain significant contact hot spots.

A low resistance fault may develop into a stable and low resistance condition or may de-stabilise to an open circuit condition or may have a sporadic behaviour anywhere between the specified extremities of the sensing load line.

The interruption of fault current and the isolation of a low resistance fault in a primary dc power source 40 will now be described.

The magnitude of fault current contribution from the first dc collection network $64_1$ into the corresponding dc network 18 will be dependant upon the topology of the collection point 66 and the characteristics of the power receiving end of the dc transmission link 68 but in any case must be compliant with the requirement for sensing current to be as specified, i.e. the reverse power flow characteristic of the first dc collection network $64_1$ must follow the same characteristic as that of any controller or regulator for the primary dc power source and more particularly, the voltage in the dc network must initially be allowed to collapse in accordance with a current characteristic comprising points B, C and D. Thereafter the fault current contribution from the first dc collection network $64_1$ into the corresponding dc network 18 must be passively limited. This means that the fault current and voltage at the vacuum switches 4a, 4b of the vacuum switch assembly 1 that is connected to the faulty primary dc power source, after the current limit overshoot transient C and the settling of all primary dc power sources and the passively limited contribution from the first dc collection network $64_1$ into the corresponding dc network 18, lies somewhere between points G and F and may be steady state or sporadic in nature. If the fault is sporadic, the mean trajectory of the time-variable locus of current and voltage in the fault (the fault load line) will by definition be coincident with the sensing load line. It will be understood that such time-variable loci will often comprise multiple counter-clockwise loops that circulate around the mean dc load line, the most basic examples are of the same form as the transient responses shown in FIG. 4 between points F, H1 and G (well damped) and points F, H2 and G (resonant) and whose time progression is indicated by the arrows between points F and H1 and between F and H2, respectively. However, these describe conditions where the extinction of the arcs in the vacuum switches cause current to be irreversibly interrupted. A more detailed technical understanding of the time-variable loci is not necessary for the present invention.

The current transducers 8a, 8b of the vacuum switch controller 10 that is associated with a primary dc power source that suffers a symmetrical low resistance fault are exposed to the fault current that flows into the primary dc power source. This fault current comprises four significant components, listed in time sequence;

(i) a very short duration (typically <200 μs) capacitive inrush,
(ii) a short duration (typically <5 ms) regulator overshoot,
(iii) a short duration (typically <10 ms) residence in current limit region between points B and D, followed by:
(iv) a transition (typically <50 ms) to the sensing current region between points G and F.

These components, when summated, have sufficient amplitude and duration for the current input signals that are received by the vacuum switch controller 10 to be received with a high signal to noise ratio, i.e. reasonableness filtering requirements are minimal during these phases of the development of the fault. More particularly, it is known that arcing type faults in HVDC systems present a relatively low arc voltage when compared with the normal working voltage of the dc network 18 and the fault current development during such a fault is influenced only marginally by the arc voltage. The passive rectifier 60 of the faulty primary dc power source 40 provides an anti-backfeed function that would normally prevent faults on the power input side of the rectifier from leading to the development of fault currents in the output side but it is possible that the diodes may fail and lead to the application of a low fault resistance to both the output circuits and the internal circuits of the electrical generator 42. Again, the voltages of the internal circuits of the electrical generator 42 are far less than the dc network voltage. Low resistance faults between positive and negative dc lines 50a, 50b of the primary dc power source (symmetrical faults) will cause substantially equal and opposite currents to flow in positive and negative dc lines and the fault current will have a relatively large (typically <3 pu of dc network rating capacitive inrush component and <1.2 pu of the dc network rating regulator overshoot component) peak magnitude. Low resistance faults between one dc line of the primary dc power source and ground (asymmetrical faults) will have a significantly smaller peak magnitude which will be determined by any collection point grounding resistances and the presence of a ground fault will be identified more effectively by checking for positive and negative pole voltage parity. The presence of either of these modes of fault current must be detected and this information latched during the development of the fault and more particularly before the fault current has been reduced to the level set by the sensing load line.

Irrespective of the type of fault, when the vacuum switch controller 10 detects a fault condition that requires the vacuum switches to open, this fault condition is latched, the vacuum switch controller initiates an inter-tripping signal 76 to the other vacuum switch controllers and instructs the vacuum switches 4a, 4b to open when it is safe to do so. The inter-tripping signal line 76 is preferably held in a trip state until interlocking conditions are active as described above.

Vacuum switch assemblies 1 that are connected to operational primary dc power sources 40 that are not faulty receive the inter-tripping signal 76 and carry out the necessary control actions to regulate the output current and output voltage of their associated primary dc power sources to zero to ensure that the dc network voltage and current cannot accidentally increase while the vacuum switches 4a, 4b in the vacuum switch assembly that is associated with the faulty primary dc power source are being opened.

When it is considered necessary to reduce the output current of all primary dc power sources that would potentially contribute fault current in a low resistance fault, should such a fault occur, by initiating the inter-tripping signal, then the locus of primary dc power source current and voltage passes directly from point B to point E as shown in FIG. 4. When respective vacuum switch controllers receive the inter-tripping signal 76 they will change the state of the output enable signal 70 that is provided to the converter controller 56 of its associated primary dc power source 40 from the first state (e.g. set high) to the second state (e.g. set low), i.e. to force the converter controller to reduce the output current and output voltage of the DC/DC power converter 44 to zero. Since a low resistance is not present a fault current is not present and this reduction in the output voltage causes a corresponding reduction in the output current that is supplied to the first dc collection network $64_1$. The exact trajectory of the locus between points B and E depends on the under-voltage responses of the first dc collection network $64_1$ and the transmission link 68.

A similar locus applies when a single primary dc power source is reduced to zero in response to an operator request signal 74.

After detecting the de-activation of the inter-tripping signal 76 and optionally that the dc network voltage is at the open circuit voltage extremity of the sensing load line, the vacuum switch controller 10 of any operational primary dc power source 40 can change the state of the output enable signal 70 from the second state (e.g. set low) back to the first state (e.g. set high) so that the converter controller 56 can resume independent regulation of the DC/DC power converter 44. The primary dc power source 40 is then allowed to resume power delivery (typically within about 100 ms) in accordance with conventional drooping and current limiting characteristics.

FIG. 5 shows a timing diagram for a situation where four primary dc power sources $40_1$, $40_2$ ... $40_4$ (i.e. n=4) are connected to the first dc collection network $64_1$ of the dc network 18 and where one of the primary dc power sources $40_1$ experiences a low resistance fault. Prior to the fault all four primary dc power sources $40_1$, $40_2$ ... $40_4$ are delivering 1 pu current into an un-specified load on the first dc collection network $64_1$. Then the low resistance of the fault causes the dc network voltage to experience a step reduction and all primary dc power sources $40_1$, $40_2$ ... $40_4$ and associated vacuum switch assemblies $1_1$, $1_2$ ... $1_4$ experience substantially the same voltage reduction since they are parallel connected by the first dc collection network $64_1$ and resistive voltage drops in interconnecting cables are insignificant. After a brief transient over-current the three primary dc power sources $40_2$ ... $40_4$ that are operating normally deliver slightly over 1 pu current into the dc network 18 whilst the faulty primary dc power source $40_1$ experiences a corresponding negative transient current before settling at a fault current that is slightly over negative 3 pu, i.e. the current in the vacuum switches 4a, 4b of the vacuum switch assembly $1_4$ associated with the faulty primary dc power source $40_1$ reverses. For the purposes of this description, the fault current contribution that the dc network receives from the dc transmission link 68 is neglected but will in any case have minimal effect on this aspect of protection system behaviour. The current within the fault may experience a contribution from within the faulty primary dc power source $40_1$ and this current must be interrupted by other means within the primary dc power source.

The output current and output voltage of the three primary dc power sources $40_2$ ... $40_4$ that are operating normally are reduced to zero by their converter controllers 56 and this condition can be maintained on receipt of an inter-tripping signal 76 from the vacuum switch controller 10 associated with the faulty primary dc power source $40_1$. As described above, the converter controllers 56 are programmed not to rely on commands from the associated vacuum switch controllers 10 but the vacuum switch controllers may issue such commands if necessary to ensure safe operation of the vacuum switches 4a, 4b. After reasonableness filtering, the input signals from the current and voltage transducers 8a, 8b and 6a, 6b are provided to respective current Hi/Lo and voltage Hi/Lo threshold detectors, then to an AND function whose output is (Voltage Lo) AND (Current Hi), then to a reasonableness filter (which introduces a delay), then to a latch. Once this fault signal is latched it remains so until the inter-tripping signal 76 is de-activated (inter-tripping release). The latched signal is used by the vacuum switch controllers 10 to change the output enable signal 70 from the first state (e.g. set high) to the second state (e.g. set low) to force the converter controllers 56 to carry out the necessary regulatory processes. A trip signal 72 can be provided if necessary.

The vacuum switch controller $10_1$ associated with the faulty primary dc power source $40_1$ detects the fault as follows:

After reasonableness filtering, the input signals from the current and voltage transducers 8a, 8b and 6a, 6b are provided to respective fault current and voltage Hi/Lo threshold detectors, then to an AND function whose output is (Voltage Lo) AND (Fault current present), then to a reasonableness filter (which introduces a delay), then to a latch. The latched fault signal defines that an over-current fault has been detected and that the vacuum switches 4a, 4b must be opened when it is safe for them to do so.

Other fault conditions that require the vacuum switches 4a, 4b to be opened may be detected and latched by other means and the detection of any such fault condition will typically request the vacuum switches to open when safe. An example is when a ground fault occurs within a primary dc power source and this is detected by the vacuum switch controller $10_1$ by identifying a combination of disparity between positive and negative side input signals from the current transducers 8a, 8b after filtering and disparity between positive and negative side input signals from the voltage transducers 6a, 6b. When both disparities are present it is the case that the ground fault is within the primary dc power source $40_1$ and the vacuum switches 4a, 4b must be opened when it is safe to do so since the output of the primary dc power source is specified as being galvanically isolated from ground. Another example is a critical failure mode that is detected by the primary dc power source $40_1$ and accordingly the vacuum switch controller $10_1$ may receive a critical fault signal 80 from the primary dc power source.

Upon detecting that the vacuum switches 4a, 4b need to be opened the vacuum switch controller $10_1$ activates the inter-tripping signal 76 and waits until it is safe to open the vacuum switches. Safe opening conditions are detected by a sensitive and noise immune window detection process comprising the summation of both filtered input signals from the current transducers 8a, 8b with polarity defined to summate differential mode current and cancel common mode current, then further filtering to improve the signal to noise ratio of the differential mode current signal that is received by a window detector whose output is high when the modulus of differential mode current is sufficiently less than the chopping current of the vacuum switches 4a, 4b, the detection thresholds of the window detector taking into account the possible directional asymmetry of chopping current and margins for noise immunity, drift and tolerancing. Since the sensitivity of this detection process is high, the filtered differential mode current signal and the window detection thresholds are shown in magnified form in the timing diagram and these are identified in FIG. 5 by the annotation 'Magnified ×100'.

Having detected that it is safe to open vacuum switches 4a, 4b and after a reasonableness filter (which introduces a further delay) the vacuum switch controller $10_1$ commands the synchronised opening of the vacuum switches 4a, 4b as described above. The vacuum switch contacts have an actuation time before contacts part, at which time current chopping occurs, then a further actuation time as the contacts continue to separate and their ability to withstand voltage increases. Voltage transients are experienced between the contacts of each vacuum switch 4a, 4b, at the dc output terminals of the primary dc power source $40_1$ and at the positive and negative points in the dc lines 2a, 2b at which voltage feedbacks are sensed at the point in time where contacts initially part. The distribution of voltage transients corresponds with the distribution of parasitic inductance and capacitance throughout the power circuit and the initiation of the voltage transients corresponds with the point in time when chopping occurs. The multi-resonant response to chopping includes high frequency modes throughout the power circuit and these generate electromagnetic interference (EMI) and hence the vacuum switch controller responses can incorporate extensive electromagnetic compatibility (EMC) measures (EMI counter-measures). The increasing ability of the vacuum switches 4a, 4b to withstand voltage is termed recovery and a recovery time delay is started at the point when the vacuum switches are instructed to open and this time delay includes actuation time and recovery time elements. The vacuum switch controller $10_1$ receives a signal 14 from the vacuum switch auxiliary contacts that instruct that respective contact systems have been fully actuated and contact separation is complete. The inter-tripping signal 76 is de-activated when the recovery time is complete and contacts are fully open. The removal of the inter-tripping signal 76 is detected by the other vacuum switch controllers $10_2 \ldots 10_4$ and they release the output enable signals 70 back to the first state (e.g. set high) to allow the respective primary dc power sources $40_2 \ldots 40_4$ to firstly ramp up their output voltage towards the normal working level of the dc network and then progressively re-establish their respective 1 pu current contribution to the load on the dc network. In addition to initiating the inter-tripping signal 76 as above, the latched fault detection process is used to initiate and maintain the protective shut down of the faulty primary power source $40_1$.

The collection point 66 will now be further described with reference to FIG. 6 which shows an arrangement where the dc collection networks $64_1, 64_2 \ldots 64_n$ are connected in parallel to the dc transmission link 68 by means of connection circuits. In practice, it will be readily appreciated that any suitable number of dc collection networks may be connected to the dc transmission link 68 by means of such a collection point.

Each dc collection network $64_1, 64_2 \ldots 64_n$ receives power from n primary dc power sources $40_1, 40_2 \ldots 40_n$ through n associated vacuum switch assemblies $1_1, 1_2 \ldots 1_n$ as shown in FIG. 3. The dc lines of the connection circuits are connected in parallel to the dc lines of the dc transmission link 68 by two-pole off load isolators 84. The connection circuits also include earthing switches 86. The operation of the off load isolators 84 and the earthing switches 86 is manually controlled and actuated, and this may be achieved using conventional HVAC working practices to allow faulty sections of the dc network 18 to be isolated for maintenance or repair.

The conventional common fail-safe system for the inter-tripping signal 76 extends into the collection point 66 as shown. The individual inter-tripping signals for each dc collection network $64_1, 64_2 \ldots 64_n$ are connected in parallel to define an inter-tripping system that is common throughout the groups (or clusters) of primary dc power sources and the converter station (not shown) that generally receives power from the dc transmission link 68. In this way, the vacuum switch controller 10 of any vacuum switch assembly 1, or the control and protection system of the converter station that receives power from the dc transmission link 68, can activate an inter-tripping signal 76 so that the maximum prospective current that can flow in the dc network 18 at the time of initial opening of vacuum switch contacts is limited in compliance with point F in FIG. 4. This allows the safe operation of any vacuum switch assembly 1.

Generally the vacuum switch controller 10 that activates the inter-tripping signal 76 in response to a fault condition or an operator command also de-activates the inter-tripping signal after it has safely opened the contacts of its associated vacuum switches but the fail safe topology of the circuits that apply the inter-tripping signal must also permit a second or further vacuum switch controller to apply and maintain the inter-tripping signal in its activated state, i.e. the activation of the inter-tripping signal by any vacuum switch controller must take precedence over attempts by an other vacuum switch controller to de-activate the inter-tripping signal.

What is claimed is:

1. A vacuum switch assembly for interrupting and isolating fault current, the vacuum switch assembly comprising:
   first and second dc lines electrically connectable to the dc output terminals of a primary dc power source and a dc network, at least one of the first and second dc lines including at least one vacuum switch having contacts, each vacuum switch having a chopping current which is dependent upon the prevailing operating conditions of the vacuum switch before its contacts open;
   a passive dc power supply unit electrically connected to the first and second dc lines, the passive dc power supply unit including a secondary dc power source; and
   a vacuum switch controller for independently controlling the opening and closing of the contacts of each vacuum switch, wherein the vacuum switch controller is adapted to selectively open the vacuum switch contacts when a fault condition or an operator request has been identified and when the current flowing between respective vacuum switch contacts is below the chopping current.

2. The vacuum switch assembly of claim 1, wherein the vacuum switch controller is adapted to open the vacuum switch contacts when the current flowing between the contacts is a non-zero current.

3. The vacuum switch assembly of claim 1, wherein the first dc line includes a first vacuum switch and the second dc line includes a second vacuum switch.

4. The vacuum switch assembly of claim 1, wherein the passive dc power supply unit further includes a resistor and at least one blocking diode.

5. The vacuum switch assembly of claim 1, wherein the first and second dc lines are electrically connectable to the dc network by off load isolators.

6. The vacuum switch assembly of claim 1, further including a voltage transducer for measuring the dc voltage in at least one of the first and second dc lines of the vacuum switch assembly and providing input signals to the vacuum switch controller.

7. The vacuum switch assembly of claim 1, further comprising a first voltage transducer in the first dc line and a second voltage transducer in the second dc line, the first and second voltage transducers providing input signals to the vacuum switch controller.

8. The vacuum switch assembly of claim 6, further including a current transducer for measuring the dc current in at least one of the first and second dc lines of the vacuum switch assembly and providing input signals to the vacuum switch controller.

9. The vacuum switch assembly of claim 1, further comprising a first current transducer in the first dc line and a second current transducer in the second dc line, the first and second current transducers providing input signals to the vacuum switch controller.

10. The vacuum switch assembly of claim 8, wherein the vacuum switch controller uses the input signals from the voltage and/or the current transducers to identify a fault condition.

11. The vacuum switch assembly of claim 8, wherein the vacuum switch controller uses the input signals from the voltage and/or current transducers to determine when the vacuum switch contacts can be opened.

12. The vacuum switch assembly of claim 1, wherein the vacuum switch controller has a fast-acting electronic output that is connected to an input of each vacuum switch.

13. The vacuum switch assembly of claim 1, wherein the vacuum switch controller is adapted to activate an inter-tripping signal before the vacuum switch contacts are opened.

14. The vacuum switch assembly of claim 13, wherein the vacuum switch controller is adapted to de-activate the inter-tripping signal after the vacuum switch contacts have been opened and any fault current has been interrupted.

15. An arrangement comprising:
   a plurality of vacuum switch assemblies, each vacuum switch assembly comprising:
      first and second dc lines electrically connectable to the dc output terminals of a primary dc power source and a dc network, at least one of the first and second dc lines including at least one vacuum switch having contacts, each vacuum switch having a chopping current which is dependent upon the prevailing operating conditions of the vacuum switch before its contacts open,
      a passive dc power supply unit electrically connected to the first and second dc lines, the passive dc power supply unit including a secondary dc power source, and
      a vacuum switch controller for independently controlling the opening and closing of the contacts of each vacuum switch, wherein the vacuum switch controller is adapted to selectively open the vacuum switch contacts when a fault condition or an operator request has been identified and when the current flowing between respective vacuum switch contacts is below the chopping current; and
   a dc network having first and second dc lines, the first and second dc lines of each vacuum switch assembly being electrically connected in parallel to the first and second dc lines of the dc network;
   wherein the vacuum switch controller of a particular vacuum switch assembly is adapted to activate an inter-tripping signal, and to transmit the inter-tripping signal to the vacuum switch controller of the other vacuum switch assemblies before the vacuum switch contacts of the particular vacuum switch assembly are opened.

16. The arrangement of claim 15, wherein the vacuum switch controller of the particular vacuum switch assembly is adapted to de-activate the inter-tripping signal after the vacuum switch contacts of the particular vacuum switch assembly have been opened and any fault current has been interrupted, and to remove the inter-tripping signal from the vacuum switch controller of the other vacuum switch assemblies.

17. An arrangement comprising:
   a vacuum switch assembly comprising:
      first and second dc lines electrically connectable to the dc output terminals of a primary dc power source and a dc network, at least one of the first and second dc lines including at least one vacuum switch having contacts, each vacuum switch having a chopping current which is dependent upon the prevailing operating conditions of the vacuum switch before its contacts open,
      a passive dc power supply unit electrically connected to the first and second dc lines, the passive dc power supply unit including a secondary dc power source, and
      a vacuum switch controller for independently controlling the opening and closing of the contacts of each vacuum switch, wherein the vacuum switch controller is adapted to selectively open respective vacuum switch contacts when a fault condition or an operator request has been identified and when the current flowing between the vacuum switch contacts is below the chopping current; and a primary dc power source having dc output terminals electrically connected to the first and second dc lines of the vacuum switch assembly.

18. The arrangement of claim 17, wherein the primary dc power source includes a power generating device, a DC/DC power converter, and a converter controller for regulating the output current and output voltage at the dc output terminals of the DC/DC power converter.

19. The arrangement of claim 18, wherein the primary dc power source includes an auxiliary power supply unit that is electrically connected to the dc output terminals of the DC/DC power converter.

20. The arrangement of claim 17, wherein the primary dc power source includes an output filter that is electrically connected between the dc output terminals of the DC/DC power converter.

21. The arrangement of claim 17, wherein the converter controller is adapted to reduce the output current of the primary dc power source to zero when a fault condition has been identified by the converter controller.

22. The arrangement of claim 17, further including a voltage transducer for measuring the dc voltage in at least one of the dc output terminals of the primary dc power source and providing input signals to the converter controller.

23. The arrangement of claim 17, further comprising a first voltage transducer in the first dc output terminal and a second voltage transducer in the second dc output terminal, the first and second voltage transducers providing input signals to the converter controller.

24. The arrangement of claim 22, further including a current transducer for measuring the dc current in at least one of the dc output terminals of the primary dc power source and providing input signals to the converter controller.

25. The arrangement of claim 17, further comprising a first current transducer in the first dc output terminal and a second current transducer in the second dc output terminal, the first and second current transducers providing input signals to the converter controller.

26. The arrangement of claim 24, wherein the converter controller uses the input signals from the voltage and/or the current transducers of the primary dc power source to identify a fault condition.

27. The arrangement of claim 17, wherein the vacuum switch controller of the vacuum switch assembly is adapted to force the converter controller to reduce the output current of the primary dc power source to zero when a fault condition or operator request has been identified by the vacuum switch controller, or when an inter-tripping signal is received by the vacuum switch controller.

28. The arrangement of claim 17, wherein the converter controller regulates the output current of the primary dc power source with reference to one or more control signals transmitted by the vacuum switch controller of the vacuum switch assembly.

29. An arrangement comprising:
a vacuum switch assembly comprising:
first and second dc lines electrically connectable to the dc output terminals of a primary dc power source and a dc network, at least one of the first and second dc lines including at least one vacuum switch having contacts, each vacuum switch having a chopping current which is dependent upon the prevailing operating conditions of the vacuum switch before its contacts open,
a passive dc power supply unit electrically connected to the first and second dc lines, the passive dc power supply unit including a secondary dc power source, and
a vacuum switch controller for independently controlling the opening and closing of the contacts of each vacuum switch, wherein the vacuum switch controller is adapted to selectively open the vacuum switch contacts when a fault condition or an operator request has been identified and when the current flowing between respective vacuum switch contacts is below the chopping current; and
a dc network having first and second dc lines, the first and second dc lines of the vacuum switch assembly being electrically connected to the first and second dc lines of the dc network;
wherein the dc network includes a collection point connected to a dc transmission link.

30. The arrangement of claim 29, wherein the dc transmission link is connected to a converter station including a controller that is adapted to activate an inter-tripping signal, and to transmit the inter-tripping signal to the vacuum switch controller of the vacuum switch assembly.

31. A vacuum switch assembly comprising:
a first dc line and a second dc line, at least one of the first dc line and the second dc line comprises at least one vacuum switch having contacts and chopping current dependent upon operating conditions of the vacuum switch while closed;
a primary power supply configured to supply power to the first dc line and the second dc line; and
a vacuum switch controller independently controlling opening of the contacts of each of the at least one vacuum switch based on an occurrence of a fault condition and when current flowing between respective contacts of the at least one vacuum switch is below the chopping current.

* * * * *